United States Patent [19]
Cope

[11] Patent Number: 5,969,912
[45] Date of Patent: Oct. 19, 1999

[54] BIDIRECTIONAL MAGNETIC READ/WRITE RECORDING HEAD SURFACE CONTOUR WITH PLURALITY OF BERNOULLI POCKET CAVITIES FOR GENERATING VERY LOW MEDIA-TO-HEAD SEPARATIONS

[76] Inventor: James Robert Cope, 4304 County Rd., Atwood, Colo. 80722

[21] Appl. No.: 08/988,196

[22] Filed: Dec. 10, 1997

[51] Int. Cl.[6] .............................. G11B 5/187; G11B 5/60; G11B 15/64
[52] U.S. Cl. ............................................ 360/122; 360/102
[58] Field of Search .................................... 360/102, 103, 360/121, 122, 125, 130.2, 130.21, 130.3, 130.34

[56] References Cited

U.S. PATENT DOCUMENTS

| | | | |
|---|---|---|---|
| 3,170,045 | 2/1965 | Baumeister et al. | 179/100.2 |
| 3,247,329 | 4/1966 | Tomita et al. | 179/100.2 |
| 3,319,238 | 5/1967 | Jacoby | 340/174.1 |
| 3,327,916 | 6/1967 | Weidenhammer et al. | 226/97 |

(List continued on next page.)

FOREIGN PATENT DOCUMENTS

452846 A2   10/1991   European Pat. Off. .

OTHER PUBLICATIONS

ANSI Standard X3B5/97–088, Magnetic Tape Cartridge for Information Interchange 0.50 in, Serial Serpentine, 208–Track, 85,938 bpi DLT5 Format, Jun. 1, 1997, pp. 9–10, paragraph 5.13, Flexural Rigidity (determination).
Textbook titled, 'College Physics', by Sears and Zemansky, Published 1955 by Addison–Wesley Publishing Company, pp. 246–254.
R.E.Norwood, Effects of Bending Stiffness in Magnetic Tape, IBM Journal Research Development, vol. 13–2, pp. 205–208, (1969).
J.T.S.Ma,An Investigation of Self–Acting Foil Beargins, Journal of Basic Engineering, Paper 65–LUBS–4, (1965).
K.J.Stahl, et al, Dynamic Response to Self–Acting Foil Bearings,IBM Journal Research Development, vol. 18–6, pp. 513+,(1974).
S.P.Cluman,A Simple Tape Wrap Around A Guide: Some Complexities,IEEE Transactions on Magnetics, vol. MAG–17, No. 6, Nov. 1981.
G.N.Nelson,et al, Stabilized Wasp–Waist Head, IBM Technical Disclosure Bulletin, vol. 19, No. 5, Oct. 1976.
J.A.Weidenhammer,Transducer Head for Multiple Flexible Disk Pack,IBM Technical Disclosure Bulletin, vol. 20, No. 3, Aug. 1977.
T.K.Chow, et al,Bidirectional Magnetic Head,IBM Technical Disclosure Bulletin, vol. 14, No. 9, Feb. 1972.
W.Hehl, et al,Spherical Multigroove Magnetic Head Design, IBM Technical Disclosure Bulletin, vol. 20, No. 8, Jan. 1978.

Primary Examiner—David L. Ometz

[57] ABSTRACT

A bi-directional magnetic recording/reproduce head surface contour that provides the lowest possible Head-to-Media separation at high media-to-head relative speeds with accompanying best condition head or media wear conditions. The Bernoulli Pockets provide the mechanism that forces the media to fly very close to the recording head gap(s). Depending upon the speed, data rate and capacity goals of the Tape Product the Bernoulli Pocket design can be developed per this invention to provide the required flying conditions. This operating performance is equivalent in both directions selected by a Magnetic Data Recorder. It is intended for use on single, or multiple gap data recorders that record data upon media in a Serpentine manner, in single track or multiple track formats, but may be used in single direction Data Recorders also. The design is not limited to a particular width of tape and can be used on many different data recorders using various width media. It will work well at low, medium or high speeds, but it's main advantage is reliable operation at high speeds (above 3 Meters/Sec or 120 Inches/Second).

7 Claims, 31 Drawing Sheets

U.S. PATENT DOCUMENTS

| | | | |
|---|---|---|---|
| 3,398,870 | 8/1968 | Mullan et al. | 226/97 |
| 3,416,148 | 12/1968 | Berghaus et al. | 340/174.1 |
| 3,440,360 | 4/1969 | Sugaya | 179/100.2 |
| 3,573,769 | 4/1971 | Flora | 340/174.1 |
| 3,643,037 | 2/1972 | Norwood | 179/100.2 |
| 3,821,813 | 6/1974 | Freeman et al. | 360/103 |
| 3,872,507 | 3/1975 | Sano et al. | 360/102 |
| 3,961,372 | 6/1976 | Brock et al. | 360/102 |
| 4,003,091 | 1/1977 | Wright | 360/102 |
| 4,074,330 | 2/1978 | Norton et al. | 360/102 |
| 4,163,267 | 7/1979 | DeMoss | 360/102 |
| 4,195,322 | 3/1980 | Cox et al. | 360/103 |
| 4,218,715 | 8/1980 | Garnier | 360/103 |
| 4,408,317 | 10/1983 | Gilovich et al. | 360/74.3 |
| 4,809,104 | 2/1989 | Knudsen et al. | 360/104 |
| 4,809,110 | 2/1989 | Hertrich | 360/122 |
| 4,888,657 | 12/1989 | Lacey et al. | 360/122 |
| 4,949,208 | 8/1990 | Milo et al. | 360/122 |
| 4,956,737 | 9/1990 | Brock | 360/122 |
| 5,034,838 | 7/1991 | Brock et al. | 360/122 |
| 5,047,884 | 9/1991 | Negishi et al. | 360/122 |
| 5,047,888 | 9/1991 | Mitsuhashi et al. | 360/130.34 |
| 5,055,959 | 10/1991 | Saliba | 360/122 |
| 5,065,500 | 11/1991 | Yoneda et al. | 360/122 |
| 5,289,330 | 2/1994 | Wade | 360/122 |
| 5,307,227 | 4/1994 | Okada et al. | 360/122 |
| 5,488,527 | 1/1996 | Komori et al. | 360/122 |
| 5,831,799 | 11/1998 | Kudo et al. | 360/122 |

VIEW A-A

BIDIRECTIONAL MAGNETIC READ/WRITE RECORDING HEAD SURFACE CONTOUR WITH PLURALITY OF BERNOULLI POCKET CAVITIES FOR GENERATING VERY LOW MEDIA-TO-HEAD SEPARATIONS

BACKGROUND OF INVENTION

FIELD OF INVENTION

This invention relates to improved magnetic recording of data utilizing an unique Read/Write Recording Head surface contour shape. This shape minimizes the separation between the magnetic media and the recording head gap. Demands for increased Data Storage Device data capacity and data rate to the host systems have required increased recording densities, both track and linear data. This need has been for both flexible and rigid Magnetic Data Storage Devices. In order to record data at these increased rates and densities the Data Storage Devices have had to fly the medias closer than ever before at the Media-to-Recording Head Interfaces. Otherwise Read-Write Reliability, the ability to record and recover data without error, will be degraded. In the Data Storage Arena this Reliability goal must be sustained and continuously improved.

DESCRIPTION OF THE RELATED ART INCLUDING INFORMATION DISCLOSED UNDER 37 CFP1.97 AND 1.98

In the computer data storage area, with the increases in data capacity and data rate ever increasing because of marketing demands, today's manufacturers of this equipment have moved the design goals of their products upwards without a corresponding development of the Media-to-Recording Head Interface Spacing. This spacing, if excessive, will cause read-write errors due to magnetic drop-outs in the recording process.

FIGS. 1 and 2 show how the recording linear density that is planned to be placed upon the media impacts the spacing requirements, and what the signal from this system will look like with increased interface spacing.

In FIG. 1 the magnetic media is shown with it's backing material 10 and it's magnetic material 11 that is coated onto the backing material. This Figure shows the media flying above the recording head core 12 and its record/reproduce gap 13 at a head-to-media spacing 15. The media is being held under tension 32 and is traveling relative to the recording head at fixed velocity 19. The media is already recorded elsewhere with the direction of magnetization 16 shown in magnetization zone boundaries 17. These produce an effective bit cell length 14.

FIG. 2 depicts what happens when the spacing 15 increases and what the resulting head output 20 looks like. When this spacing increases as shown as spacing 15A, spacing 15B and spacing 15C as will happen with increased media velocity 19 then the output of the head gap 13 contained in core 12 will drop as shown by output 20A, output 20B and output 20C. As can be seen in this FIG. 2 as the head gap moves farther away from the recorded lines 16 and the magnetic transition zones 17, it is increasingly harder to determine if and when the transitions zones occur relative to time. The view seen by the gap is indicated by 18 (a downward view of the media), where (as the spacing 15 increases) it is more difficult to determine where the magnetic transition zones are located with respect to time. This crossing of magnetic transition lines versus time is what generates a voltage change in accompanying circuitry (not shown here). As this gap-to-media spacing increases above the value of the bit cell length 14 the ability to detect the recorded transition 17 all but disappears. This results in reliability errors that are unrecoverable. Other systems in the machine such as error correction circuitry (also not shown) try to compensate for the problems introduced by spacing losses.

FIG. 3 shows what following the best accepted Design Rule of Thumb for the mechanical setup for a reliable read-write operation. This Design Rule says that the spacing should be no more than 25% of the bit cell length. In today's (1997) Linear Data Recorders the linear recording density on some products is around 57,000 Flux Transitions per Inch for a linear flexible media recording device. This correlates to a bit cell length 14 of about 17 Microinches. Applying this Rule means the separation spacing 15 should be around 4 to 5 Microinches on the average. Typical gap length 22 is 7 Microinches in this case and must be necessarily short for accurate detection of transition lines. At this flying height the head core 12 and gap 13 can easily detect the magnetic transitions. The view seen by the gap 18 is close enough for reliable detection. As the separation increases above this Design Rule of 25%, the transitions are more difficult to detect reliably. What has evolved in the Data Storage Device development arena is that the product's performance and capacities have been increased without a corresponding decrease in separation. Without a matching low flying height to the increased performance goals it is increasing difficult to read and write data onto magnetic media without errors occurring.

Increased media speed (for increased data rates from the product) will automatically increase spacing without any other factors being involved. Increased speed in the relative motion of the Media to the Head increases separation due to more air that is carried along by the moving member being pumped into the entrance of the media and head junction. This results in more aerodynamic lift of the media over the gap thus more spacing results.

Another area of concern for the Head Contour is to consider the possibility of wear (both media and head) that may be encountered during operation of the product. There are several aspects that should be considered with regards to wear.

First, the magnetic media that the data is recorded upon is a physical material that has properties such as Modulus of Elasticity, bending stiffness, hardness relative to wear, and other important attributes. One of these attributes of prime interest is the 'natural radius of curvature' setup when the media is bent over a support and tension applied to it's ends. Referring to FIGS. 4A–4C one sees first a support 33 of radius 30, then media 31 of finite thickness wrapped over the support with tension 32 applied at both ends. Under this stretched condition there are two tangent lines 34 where the media leaves the surface of the support outer surface. If the radius 30 is at minimum critical value (ie Critical Radius) then when the support structure 33 is directly replaced by a knife edge 37 as shown in FIG. 4C the media retains it's original shape with the CRITICAL radius 30 still present. The media curves over to the original locations of the tangent lines 34 before turning straight as shown. The radius 30 is maintained by the media over to lines 34 if the conditions for Critical Radius are present. If the media in a product of a certain head contour rides on top of a edge with radius smaller than this Critical Radius then excessive stress levels will be seen and wear of the media and the edge of the head will occur. In Mr. Stanley P. Clurman's technical article titled 'A Simple Wrap Around A Guide: Some Complexities', published in IEEE Transactions On Magnetics, Vol MAG-17, No 6. November 1981, he described how the surface is compressed under the pressure and it's relationship to the head-to-media interface design. High stresses are the result.

In designing a Head Contour one must follow the known method of calculating what this Critical Radius is; and in designing the shape of the Head Contour surface itself insure that the minimum radii anywhere on the head are equal or above this Critical Radius.

It is done as follows. First one calculates the bending stiffness of the media. The formula for this calculation is given as:

$$D = E*(t***3)*(1-v**2)/12$$

Where

E is Modulus of Elasticity (psi)

t is thickness of Media to be used (inches)

v is Poisson's Ratio for Media material (Source: ANSI Proposed Standard X3B5/97-088, June 1997, Page 9)

Assuming the wrap angle 36 (in FIG. 4) of the head gap area is known from a proposed product form factor limitations, the number of gap banks there are to be, and so forth, one calculates the following parameter:

$$X = \frac{1}{2} \text{Tan (Wrap Angle)}.$$

Then referring to FIG. 5 one selects this calculated value on the X Coordinate, projects up to the line labeled 'Knife Edge', and then over to the Y Coordinate for the related value of Y where Y=R*SQRT(T/D) From this value the Critical Radius can be determined as follows for a given design tension 32:

$$R = Y/SQRT(T/D)$$

Where

D is calculated above

T is tension determined by product design (Source: IBM Journal of Research and Development, EFFECTS OF BENDING STIFFNESS IN MAGNETIC TAPE, by R. E. Norwood, Volume 13-2, Pages 205–208 (1969))

An example of when this critical radius is exceeded is when a read-write head core 12 and gap 13 protrudes into the media 31 too far. This can be done on a product such as a Video Tape Recorder (Helical Scanner). FIG. 6 shows how this critical radius is exceeded (too small) and high stress 35 and wear lines are created. In addition the media bows over the gap thus increasing average spacing 15 across the gap and causing separation losses in the recording process.

In the majority of linear tape recorder products developed in the industry only one direction of interest has been discussed or even desired. At high media speeds and a properly designed contour there is a pressure profile setup that operates as follows. FIG. 7 shows media 31 above the head core 12 and gap 13 under tension 32 and moving at speed in direction 19. Initially pressure 40 is built up to positive value 43 under the media and above the head profile, and then it turns to vacuum (negative pressure) 42 towards the end of the contact region. The resulting pressure/vacuum profile creates a flying height 15 condition along the head contour. Ideally the head record gap would be placed under the resulting lowest point 41. This general separation occurs with every type of hydrodynamic air bearing used. In the Mr. K. J Stahl, et al, technical article titled, 'Dynamic Response of Self-acting Foil Bearings', published in the IBM Journal of Research and development, November 1974 an attempt to mathematically model the shape of the media described above is presented. The same kind of media dipping effect that occurs on a rotating drum in a Video Tape Recorder is described mathematically in Mr. J. T. S. Ma's technical article titled, 'An Investigation of Self-Acting Foil Bearings', published in the Journal of Basic Engineering, December 1965.

If the product goal is to record and read data in both directions (such as in a Serpentine format recorder where data tracks are written from Beginning of Tape (BOT) to End of Tape (EOT), and then the next track written from EOT to BOT at a new location across the media width) then the contour setup shown in FIG. 7 would not work well. FIGS. 8A and 8B show what happens when the media 31 under tension 32 is allowed travel in both directions 19. The low spot 41 shifts from one side of the contoured core 12 to the other thus not touching gap 13. There is no optimum set point for the gap anywhere on the head. The air that pumps into the interface changes from one entry edge to the other side 44.

One method used in the industry to provide closer flying with the gap (whether in one direction only or both directions) is to provide a very sharp edge at the entry to the gap area. FIGS. 9A and 9B show what happens when a sharp edge 45 is introduced. One can see the air is being pumped under the leading edge 44, thus creating separation 15 over the gap 13 and core 12. The media is again held in place with tension 32 and is moving in direction 19. With the sharp edge 45 shown in place just prior to the gap 13 the air carried along is sheared off as it enters into the contour surface. This results in a reduction of separation height 15.

However as the sharp edge starts to wear (and it will wear in time) this low flying region slowly disappears as shown in FIGS. 10A and 10B. Starting with the same setup as shown in FIG. 9B (with low separation 15B) the worn edge 46 shown in FIG. 10B will start to fly the media upwards as more air 44 is pumped into the head-to-media interface thus increasing separation 15C.

Side leakage is a very important aspect of contour design. FIG. 11A shows how this natural side leakage 47 takes place and helps bring the separation 15 into better recording range. The lowest spot 41 probably doesn't change location much but the separation 15 gets closer in value to the spacing at the lowest spot 41. In FIGS. 11A and 11B air 44 is being carried along as shown in both in the Top and Side Views with side leakage 47 occurring. This will lower spacing 15 over gap 13 and core 12 under tension 32 traveling at speed 19. This FIG. 11B also shows radius 30.

All of these design factors must be taken into account when designing a properly working recording head contour shape. In the analysis of prior patents in this field these design parameters must be considered.

In the development of head contours to be used in data storage products the following U.S. Patent Office issued patents and technical papers published appear to cover the bulk of the applicable work in this area. Their description is followed with an analysis as to applicability to this patent.

Baumeister, et al, U.S. Pat. No. 3,170,045, one part described in FIG. 12 describes a double bump hydrodynamically air lubricated magnetic tape head that teaches, along with appropriate mathematical relationships in designing a contour; a circumferentially positioned groove 60 to control tape in lateral direction, is shown to reduce separation that is larger in the middle section versus the edges. This patent describes a design that flys too high for today's recording densities, is not uniform over all possible gap position (not indicated in the patent), and provides a severe wear edge for the media in the form of the circumferential groove as media moves from curved to straight sections of the wrapped media.

In a parallel technical design (to the previous patent) is Misters W. Hehl and H. Lutz article published in the IBM Technical Disclosure Bulletin, Volume 20, No 8, January 1978, where a head spherical contour has numerous longitudinally running grooves of various depths in order to control and stablize the head-to-media interface. As is obvious with this idea the cavities formed by the grooves are not sealed from atmosphere and consequently would not provide negative pressure head to bring the media close to the gap. They also would be subject to excessive wear where the straight section of the media would dip into the groove recesses.

Tomito, et al, U.S. Pat. No. 3,247,329, it's side view shown in FIG. 13 is one of early patents in this field that shows a space and support structure before and after the recording head that is to stabilze the media. This patent's purpose is to eliminate media ripples and waves 61 that show up in the leading and trailing areas to the media-to-head interface spacing 15. However it doesn't provide for low enough flying for today's recording parameters because of the wear issue discussed earlier. Also discussed earlier it is very difficult to generate low flying with leading recesses especially when no effort is made to shear the air as this patent does not try to do.

Weidenhammer, et al, U.S. Pat. No. 3,327,916, depicted in a simplified side view in FIG. 14 shows an external vacuum 62 controlled air film read-write head with ports of various geometric shapes that endeavor to provide a stable platform for the traveling media. It does not attempt or teach bringing the media very close to the gap. This is evident by the large distance from the holes and the gap 13. An air film will generate again within this distance.

Mullan, et al, U.S. Pat. No. 3,398,870, with a similar simplified side view (as above) in FIG. 15 attempts to provide the function of Weidenhammer's patent but places slots 63 in lieu of vacuum ports. These slots again are not close to the gap 13. Also the flying spacing will increase with wear occuring on the leading edges of these slots.

Sugaya, U.S. Pat. No. 3,440,360, with a top view shown in FIG. 16 teaches the use of cutting holes on either side of the recording gap in order to produce the desired track width, but does not address any effects on separation changes. In fact this patent suggests filling-in these gap side holes with hard, wear resistant materials.

Flora, U.S. Pat. No. 3,573,769, with a greatly simplified side view in FIG. 17 is one of the early patents that teaches shearing off of the air film that travels 19 with the media before it reaches the recording gaps. While the spacing of the media over the gaps is reduced, utilizing these forward slots 45 (it is known today) will wear and cause the media to lift. Thus because of this forward, cross edge wear the operational life of the head is reduced. Also this patent says nothing about controlling the spacing at it's gaps. The recording channel electronics design that looks at a head built per this patent will be setup (with equalization and other techniques) to read-write on a new head without any wear occurring yet. As the media flys higher with wear the electronics design will not be optimum and errors will occur that are difficult to correct.

Norwood, U.S. Pat. No. 3,643,037, with an isometric view shown in FIG. 18 is an early patent that addresses read-write operation in both the forward and reverse directions. It provides both transverse slots before and after the gaps 13, as well as cross vacuum slots 70 to pull media closer to the head surface. It will also help stabilize the media edges with parallel slots 71 running along the edge of the media. This patent does provide the same separation in both media directions initially, but depending upon the time at each direction the separation could be different for each. The vacuum sourced slots that are outboard, on either side, do not reduce flying separation at the interior gaps. The transverse slots 63 before and between each bank of gaps are open at the sides and are at essentially zero pressure. There are slots 72 between the gaps, side-to-side, and their purpose is to reduce the separations of the gap further. These side-to-side slots affect flying over the closest gap but are not closed to atmosphere thus providing any form of Bernoulli effects. The possibility of transverse and side-by-side slot edge wear affecting the media traveling higher over the gaps themselves is very high. The media will have the tendency to dip deeply into the side slots because the media is not supported well. While the slots running along the gap sides will help the net separation developed by the patent, with wear occurring it will not be low enough for today's recording parameters of higher speed and higher densities.

Freeman, et al, U.S. Pat. No. 3,821,813, with an isometric view in FIG. 19 is the first patent to have either side of the recording gap removed up close to the gap line 53. The flying height mentioned in the patent (20–50 microinches) is way too high for today's recording parameters. This patent further teaches the build-up of air film with pressure, the side leakage as the media travels over the gap 13, and cuts in the sides of the gap to allow air to escape thus lowering the separation for a spherical contour shape. The pressure built-up due to hydrodynamic properties of air at high media speeds that this contour was developed for (ie 1,000 in/sec) will bleed off better than other designs mentioned. However with high speed products such as the product using this contour the natural bleeding off of the air is not enough to lower the gap separation enough. The side cuts only provide an open-to-atmosphere path for the leakage to pass, with no external means of accelerating the side leakage flow.

Later in the 1970s Mr. G. N. Nelson, el al, published in the IBM Technical Disclosure Bulletin, Volume 19, No. 5, October, 1976, a head contour similar to the previous patent by Freeman. Again while the slots were close to the gap on both sides the recess area was not purposely sealed from the atmosphere to provide some additional force to lower the flying over the gap with vacuum pockets.

Sano, et al, U.S. Pat. No. 3,872,507, where a section view is shown in FIG. 20 teaches the idea of providing recesses on both sides of a number of recording gaps positioned side-by-side. This patent makes a point that the leading edges of the spacer (that provides recessed area on the inner gaps) is positioned below the drum surface. The cavities are not closed with media wrapped onto the drum outer surface and covering the heads themselves, and it does not place any cavity very near the gaps themselves. It does provide side leak paths to lower the overall separation over the gaps, but will not be close enough (like Freeman's patent used in this situation).

Brock, et al, U.S. Pat. No. 3,961,372, with a top view shown in FIG. 21 is the closest patent that teaches this patent's advantages, but does not have the additional downward force(s) and negative pressure effects to further reduce separation down to flying range needed today. The slots on either side of the gap 13 are not closed to atmosphere, and there is no attempt to do so. This patent does teach controlling the width 53 of the gap with slots provided on either side. The separation above the gap is much lower than if the side slots were not in place while the media travels 19.

Wright, U.S. Pat. No. 4,003,091, with a section view shown in FIG. 22 provides a convex surface that will provide media stability due to the Bernoulli Air Flow Principles. This is done by providing a vacuum (or negative pressure) area surrounding the head itself. This vacuum provides stabilizing effects by dampening waves that normally lead and lag a head that penetrates the media in a flexible media product. The head itself as shown is another spherical shape that would not provide separations needed in todays recording arena. The applied Bernoulli principle affects only the outside of the head assembly. Applying the Bernoulli Pockets next to the gap line itself as advocated by this patent to a disk product as described in this patent would provide a 1 to 2 magnitude improvement in head-to-media separation and corresponding improvement in recording capability.

At this point the Bernoulli Principle is described. With reference to the textbook titled, 'COLLEGE PHYSICS', by Sears and Zemansky, published in 1955 by Addison-Wesley Publishing, pages 246 through 254, one can see that the Bernoulli Principle is based upon the fact that as air passes over two adjacent surfaces of different lengths, on opposite sides, an slight pressure difference is setup. The air must travel over the longer surface faster to meet up with it's couterpart on the other side as in an airplane wing shown on page 254, FIG. 14-9 of the cited reference. The Bernoulli Pockets described within this patent specification setup a similar pressure difference across the media as it travels over the pocket. The cavity creates a momentary longer length for the air to travel and thus a higher velocity within the pocket itself. This creates a lower pressure within the pocket due to the Bernoulli principle, and results in a relatively higher pressure above the media. This end result is a pressure differential over the pocket location. Then the media is forced to dip into the pocket. The slightly negative pressure inside the pocket will pull air from around the edges of the pocket. If the gap is located upon one of the adjacent edges then air will be evacuated from over the gap. All of the Bernoulli areas of negative pressure talked about in the patents listed here stabilize the surrounding media in the proximity of the head, but do not address the gap itself. This is a key difference.

Weidenhammer published in the IBM Technical Disclosure Bulletin, Volume 20, No 3, August 1977, a Transducer Head for Multiple Flexible Disk Pack. In this article he covers several ways to provide an air bearing stablizing platform obviously using Bernoulli principles, however does not address making changes close-in to the recording head itself to provide very low flying over the gap.

Norton, et al, U.S. Pat. No. 4,074,330, teaches a stabilizing Bernoulli induced platform outside the gap area of the recording head; such as Wright's patent above.

DeMoss, U.S. Pat. No. 4,163,267, teaches the same slot configuration as Brock where the recording head has open-air slots on either side of the gap as presented in an alternate version of the patents objective.

Negishi, et al, U.S. Pat. No. 5,047,884, where a side sectional view in shown in FIG. 23 talks about providing negative pressure portions that help stabilize the media (disk product) around and near the recording gaps, however it has no Bernoulli effect cavities next to these gaps.

Saliba, U.S. Pat. No. 5,055,959, where an isometric view of the contour is shown in FIG. 24 provides places for the air film to bleed sideways prior to reaching the recording gaps. However with the continuous narrower island provided in-line with the gaps 13 across the head, no side leakage paths are provided at the gaps themselves as the media travels across the head 19. This head has a very complex separation increase with wear of the leading edges of the gap islands in either direction, along with the inability for side leakage near the gaps. In fact it is difficult, in light of the discussions done in this patent specification, to understand how this contour works very well at all. However it is used in the one of the most popular digital tape data recorders available today (1997), the Quantum DLT family of tape devices. Because of the inherent higher flying of this contour the wear of the head in the gap area would be small. However, conversely, it is limited in how much higher linear flux density it could reliably support.

Gilvich, et al, U.S. Pat. No. 4,408,317, teaches the addition of slots on either side of the recording element, and at an angle to tape motion, lowers the media to 40 microinches like Mullan. Using the 25% Design Rule this 40 microinches projects a reliable linear density on media of 6,250 flux changes per inch which is about 10% of today's recording density goals.

Hertrich, U.S. Pat. No. 4,809,110, is the first patent found that describes the 'natural radius of curvature' or Critical Radius for media that should be factored into the design of a recording head contour. While the accuracy and source for the formula used in this patent to determine this critical radius is not clear, it is believed to be an important aspect in head contour design work. This contour in Hertrich's patent also is one of the first to provide Bi-Directional capability at high media speeds even though no mention or claim can be found in the patent's text to this capability. For the Hertrich contour it should be noted that when wear occurs in either direction on the leading edges, the media will lift up over the gaps thus reducing read-write operation reliability. Any favorable side leakage to lower the separation is not available as mentioned in the Saliba Patent previously.

The earliest found mention of a 'Bidirectional' capable head contour is Mr. T. K. Chow and Mr. A. B. Wills article titled, 'Bidirectional Magnetic Head', published in IBM Technical Discloure Bulletin, Volume 14, No 9, February 1972. In this article it stresses the importance of maintaining uniform spacing in each direction of media traveling over the appropriate gap, and mentions how difficult it is to place a gap under the optimum location for forward and reverse directions.

In each of the above patents while there are aspects that touch upon the features of this patent, none describe a closed Bernoulli Pocket on either side of the Record/Reproduce Gap itself. Most of these referenced patents' goals were to provide much needed media stabilization effects outside the Head Core and Gap areas. The few that called out closed Bernoulli areas were for outside the Head and Gap area. None of these patents teach putting Bernoulli Pockets next to the Head Gaps themselves and would not provide close enough head-to-media separations that would meet the Design Rule of 25% of the recorded bit cell length. While it is apparent that products exist today that are recording at these high linear densities they have the risk of running into phase shift detection problems because their separations are too high. These phase shift problems occur with worse case bit patterns that will normally show up under any customer data conditions.

BRIEF SUMMARY OF THE INVENTION

Accordingly, several objects and advantages of my invention are a recording read-write head surface contour that provides very low separation between the magnetic media and the recording gap(s) of the head itself. The low flying provided will make possible reliable recording and reading of large capacity tape cartridges on high data rate magnetic data storage devices in the computer industry.

Still further objects and advantages will become apparent from a consideration of the ensuing description and accompanying drawings. The magnetic media used in data storage product utilizing this invention will have minimum wear because of the inherent stiffness of the head-to-media interface developed by this invention.

And still further objects and advantages will be the reduced recording head wear that will be seen when this invention is utilized in the magnetic media data storage device.

DETAILED DESCRIPTION OF THE INVENTION

Figure 1:
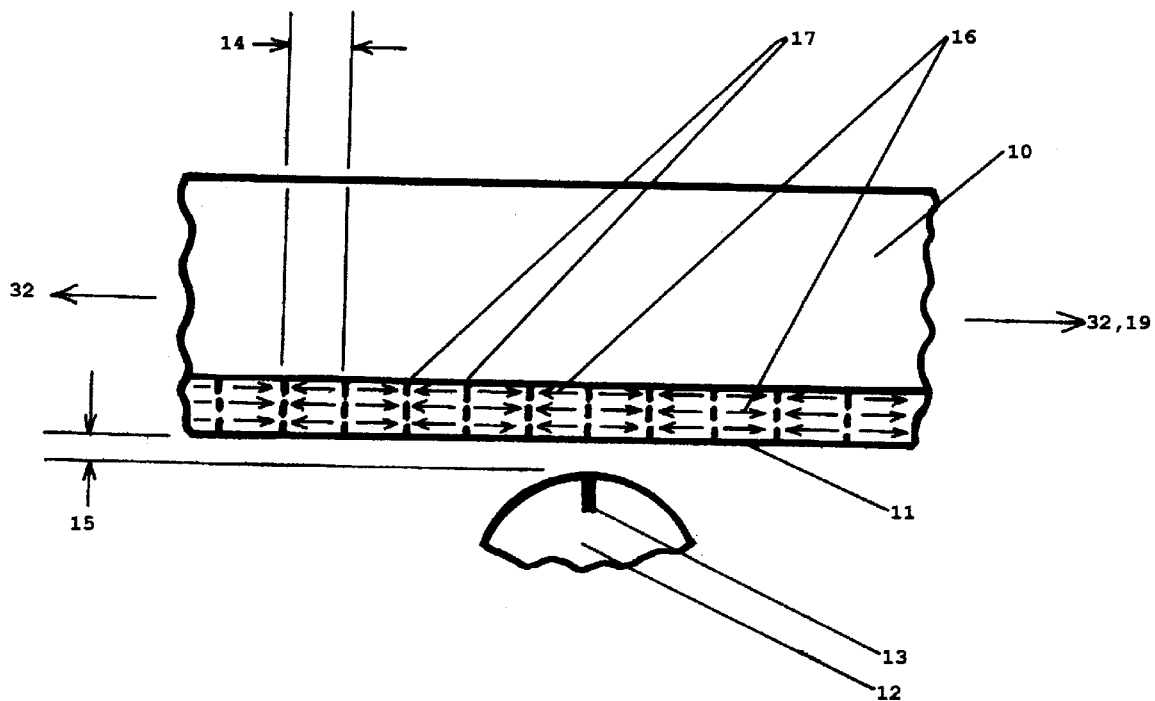
FIG. 1 is a side cut-away view of a typical magnetic media positioned over a recording head gap. This view shows typical media backing material with magnetic coating applied to it, and a typical head core and gap positioned in range to detect magnetic transitions written into the media with relative motion.
Figure 2:
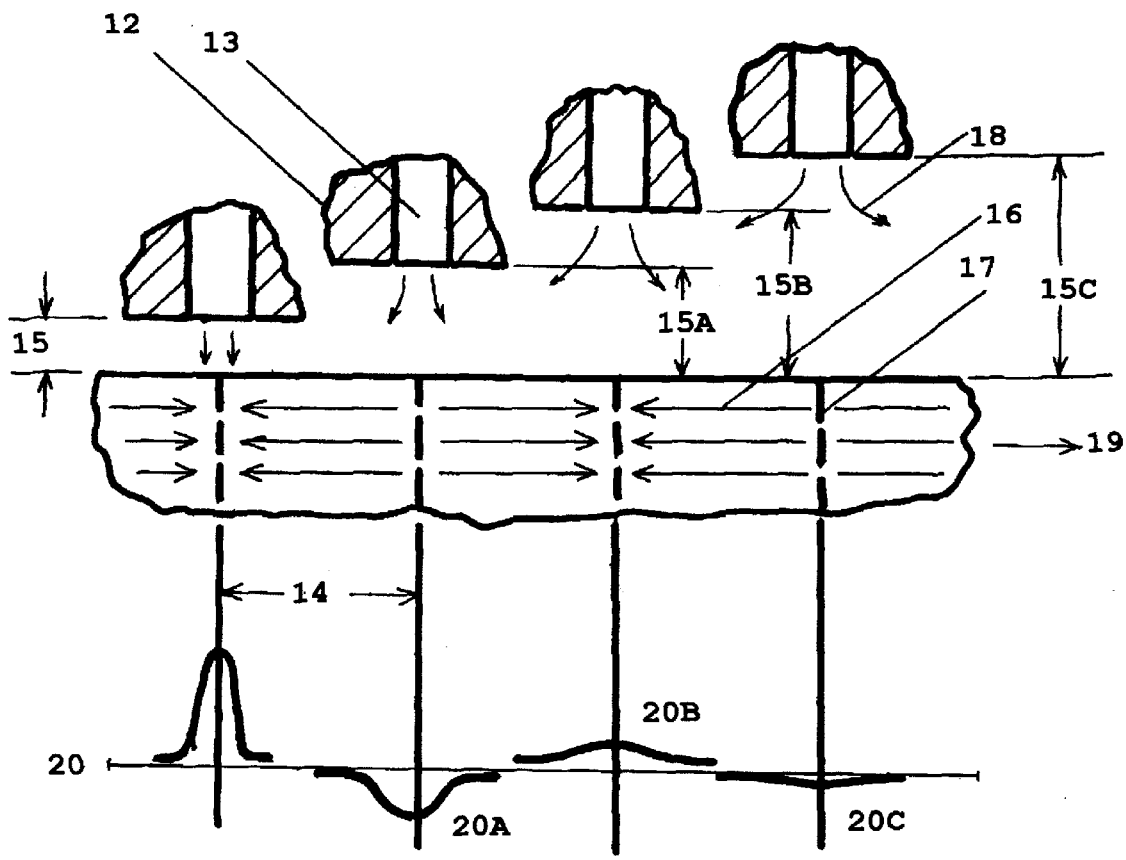
FIG. 2 is a view of the magnetic reading process where in the top view the head gap is shown at various heights over the media, the middle view shows media with magnetic zones written into it, and the bottom view shows the typical voltage output that would be seen from the head output read coil because of the various gap positions.
Figure 3:
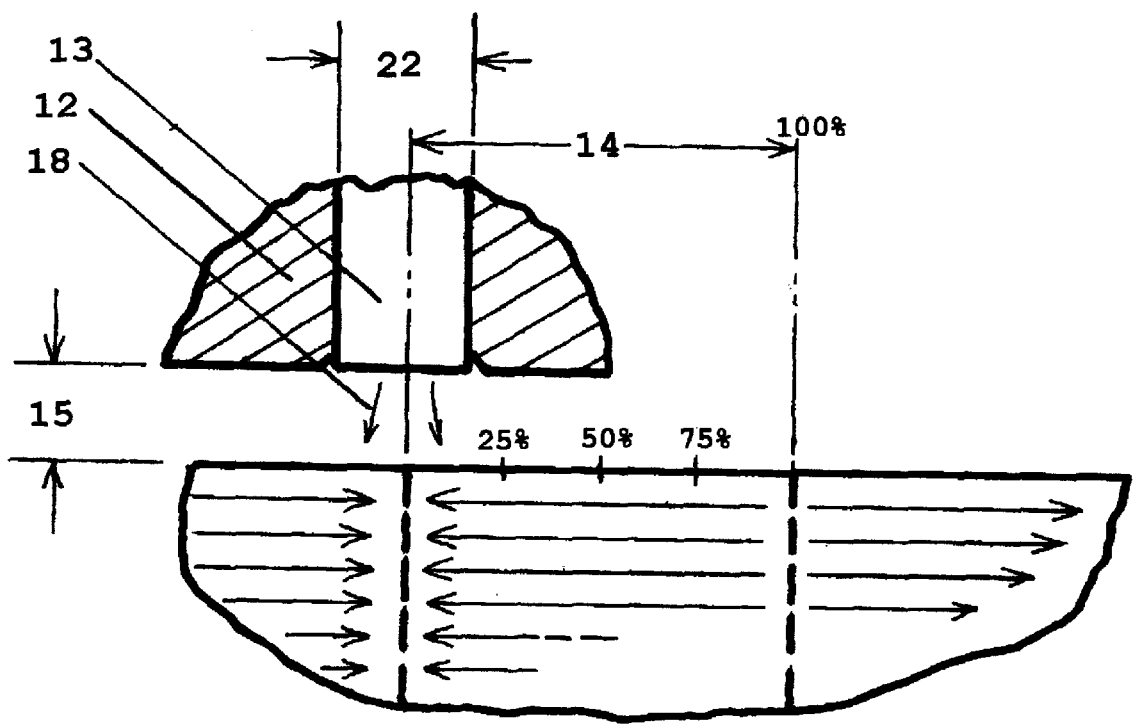
FIG. 3 is a descriptional view of the 25% Design Rule-of-Thumb for determining the most reliable and possible separation between the magnetic media and the recording/read head.
Figures 4A, 4B, 4C:
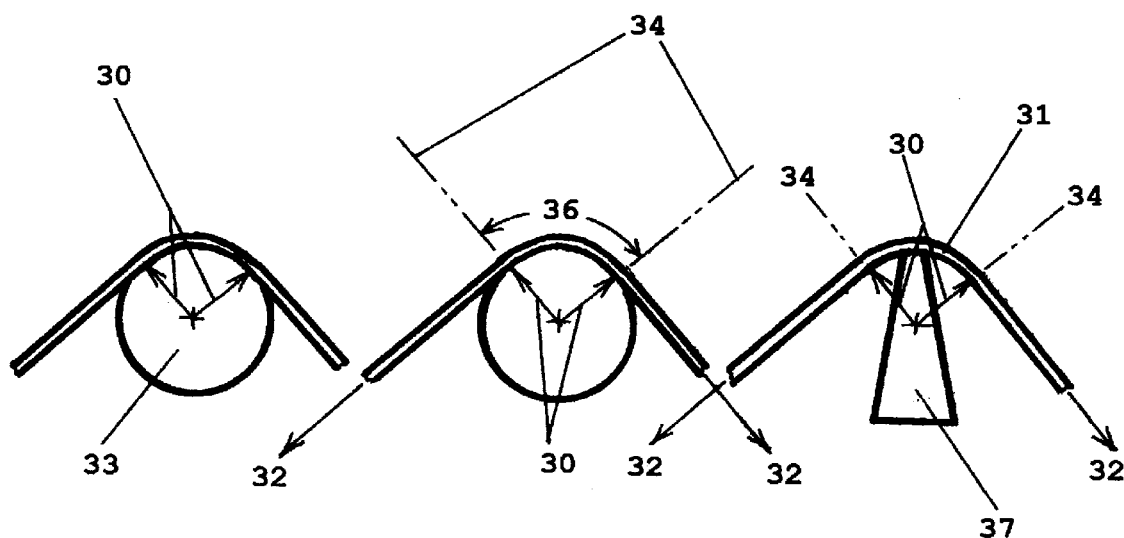
FIGS. 4A–4C are a description of how the critical radius of media under tension can be represented by both a cylinder and knife edge situation with no difference in the shape of the media position between the two conditions.
Figure 5:
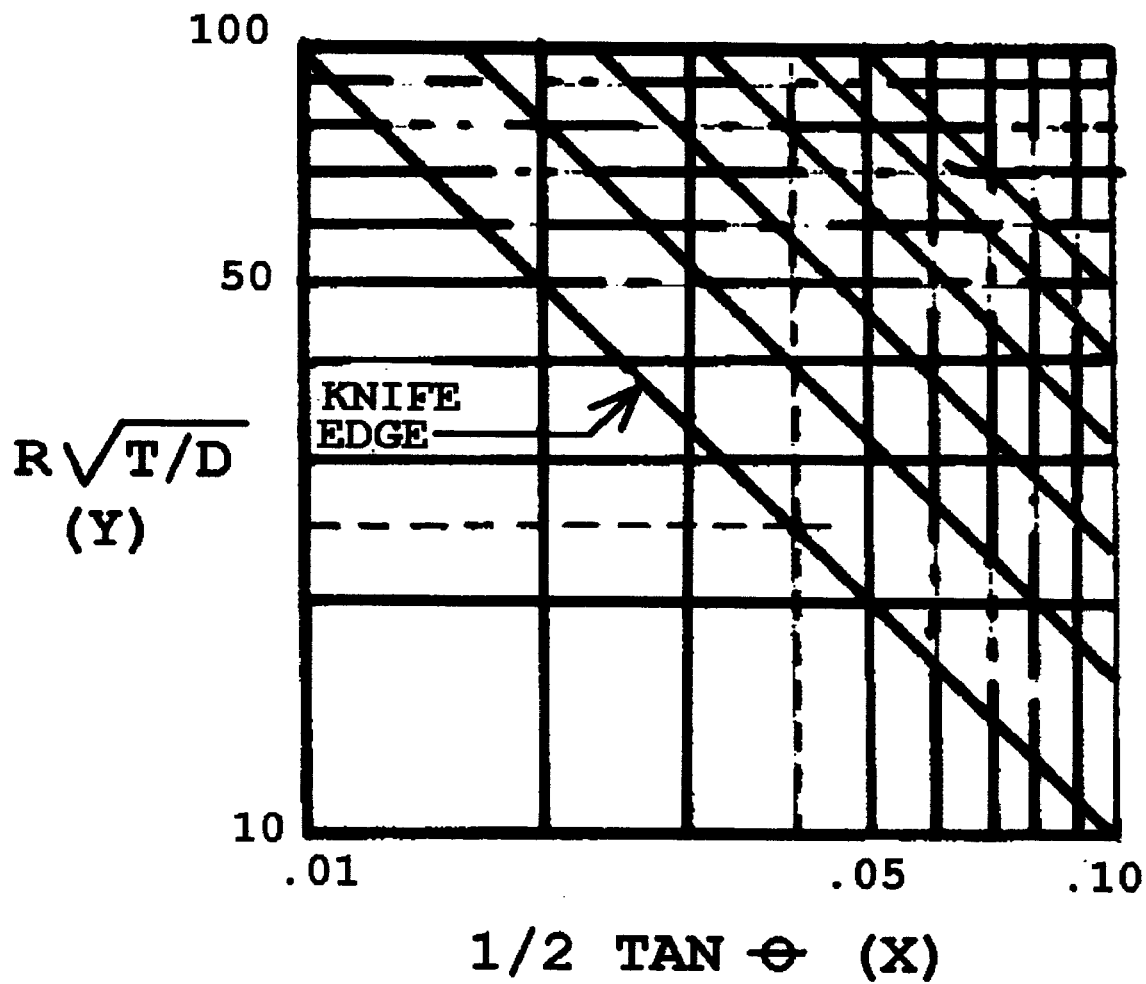
FIG. 5 is a replicate of a design graph (taken from a referenced document) used to determine the media's critical radius of curvature in order to minimize media surface and recording head edge wear.
Figure 6:
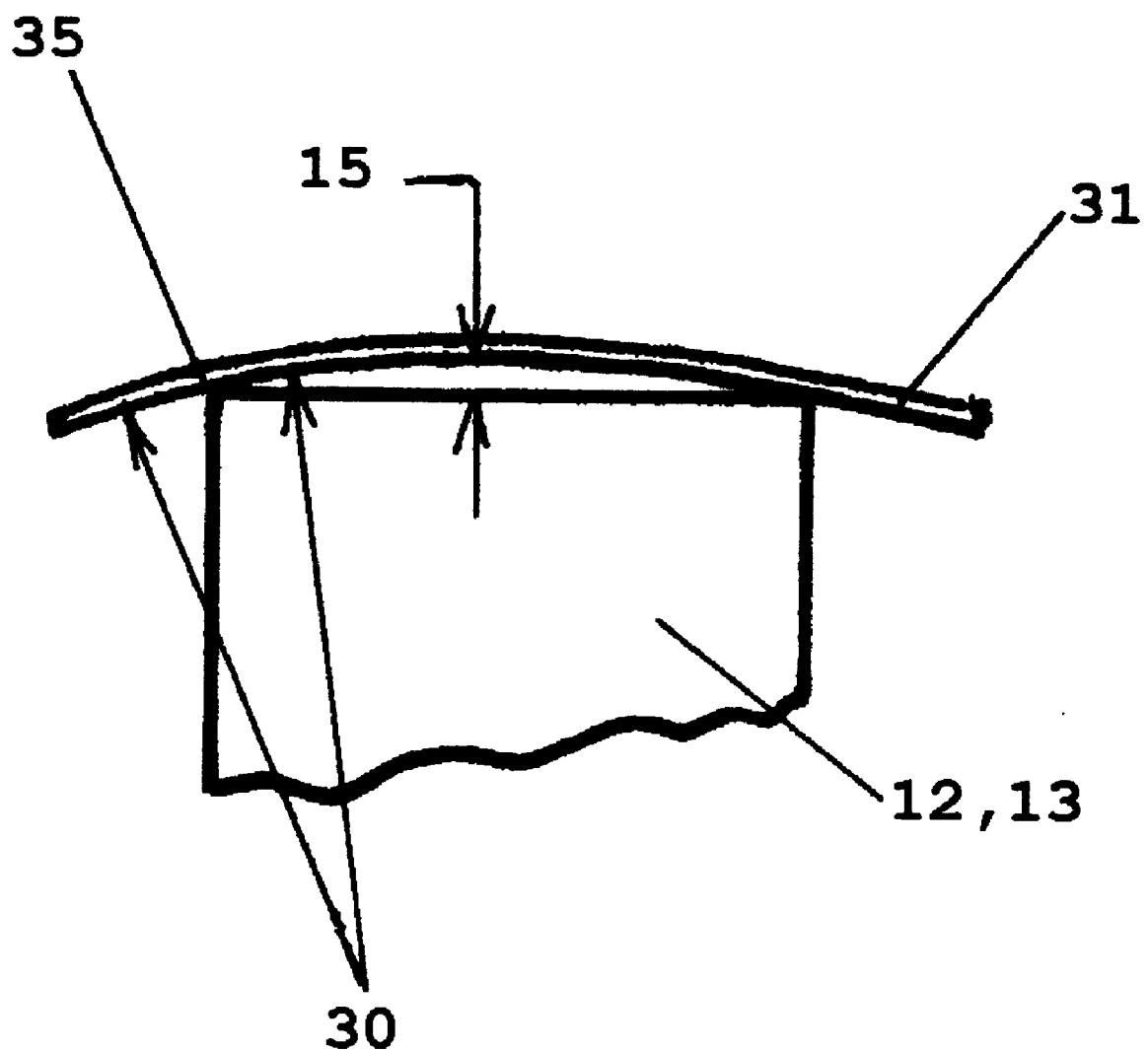
FIG. 6 is an end view of the condition of the media for a recording head that pushes too far into the stretched, supported media and causes separation to increase at the middle of the gap width due to the critical radius of the media under tension.
Figure 7:
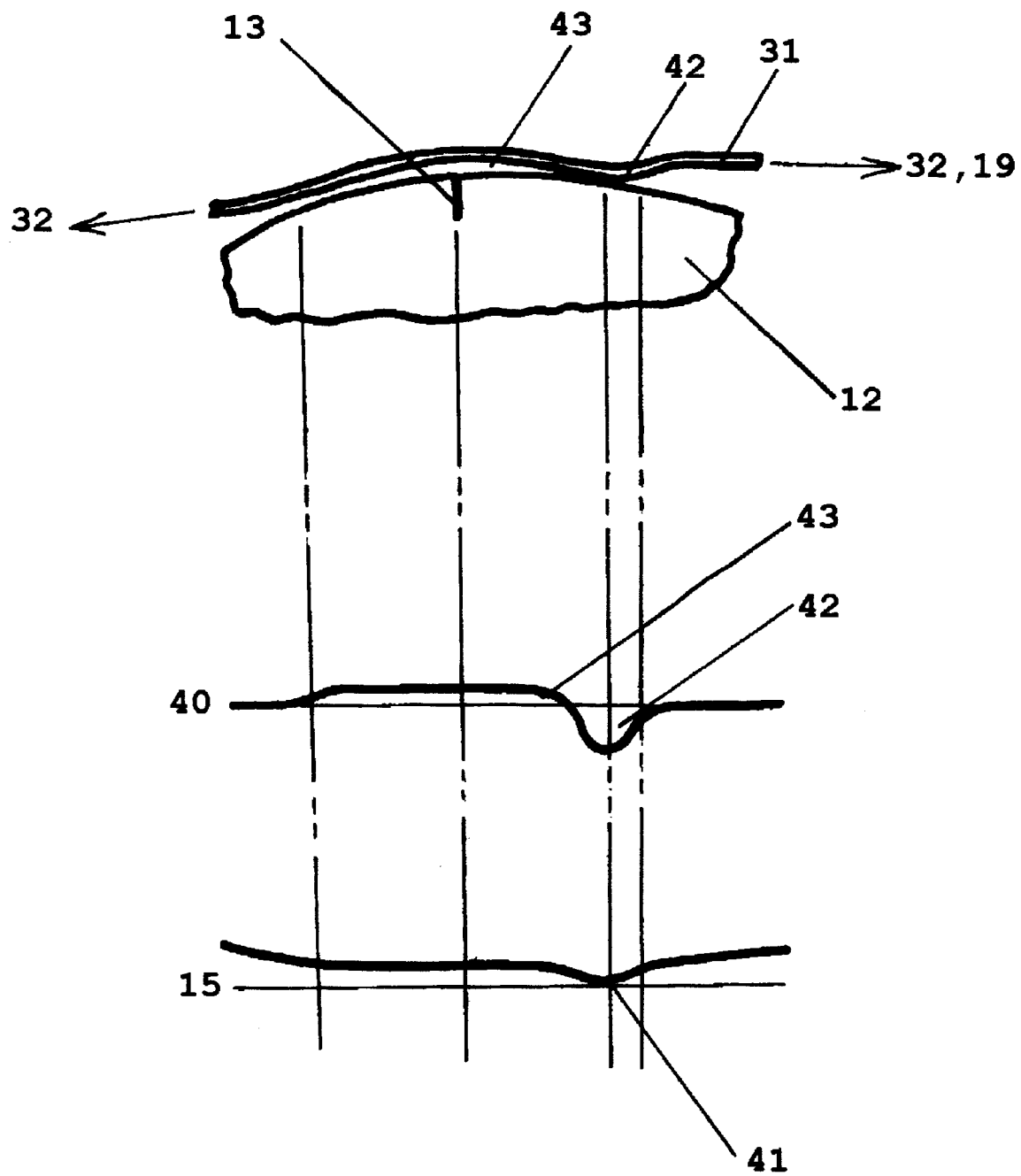
FIG. 7 is a view of the development of hydrodynamic air flow under the media as it travels across a recording head. The top view is the media stretched and traveling across a head core and gap. The middle view is the air pressure developed with the motion, and the bottom view shows the resulting separation of media over the head surface.
Figure 8A:
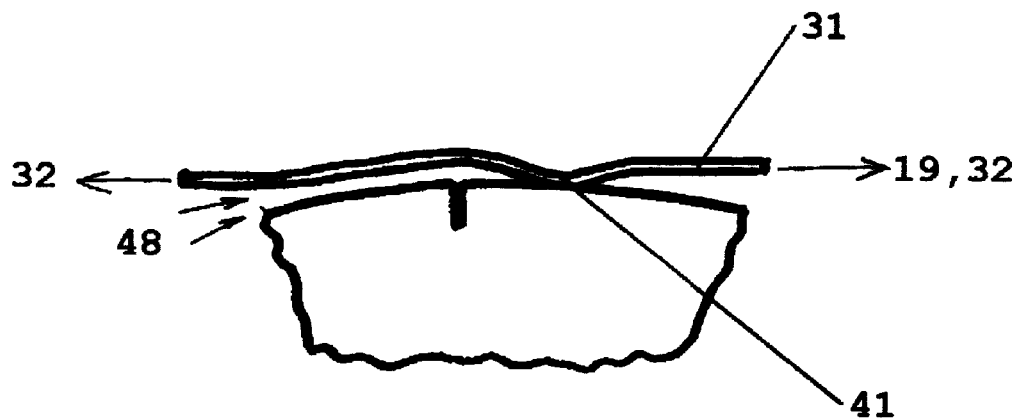
FIGS. 8A and 8B are views of where the lowest point of separation occurs when the media reverses direction and it's position relative to the recording gap.
Figure 8B:
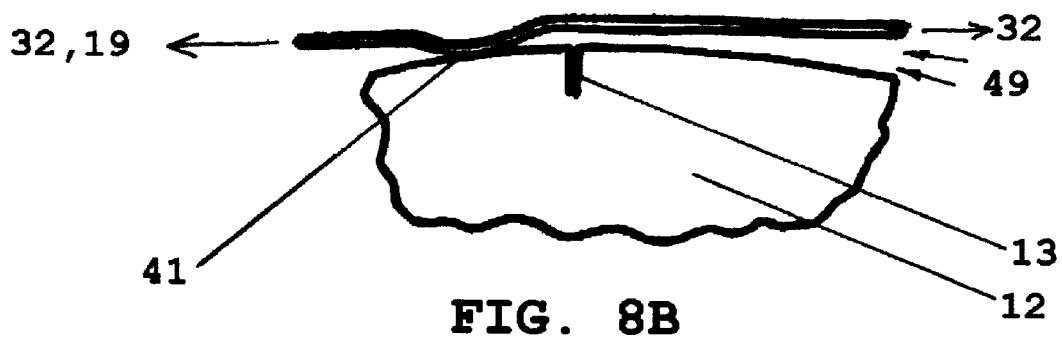
Figure 9A:
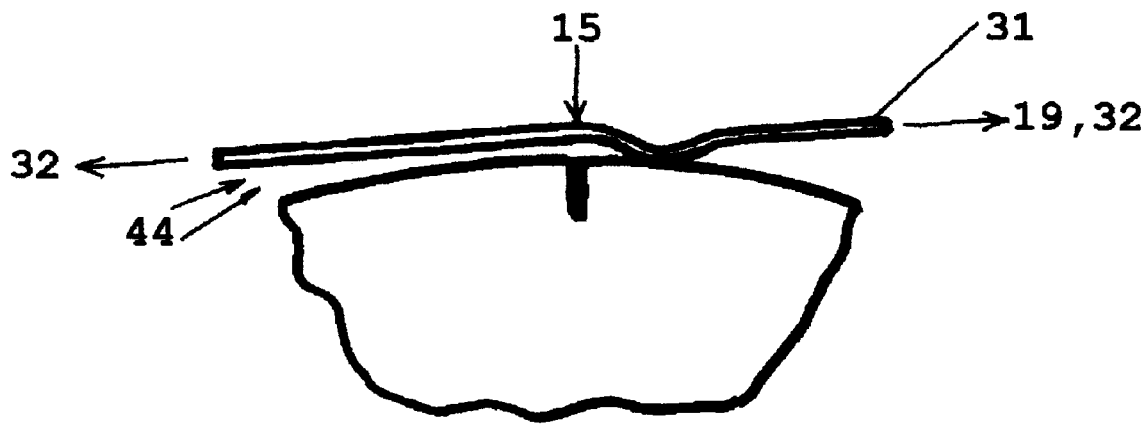
FIGS. 9A and 9B are description of how a sharp edge will shear the air film off of the media as it travels onto the recording head thus lowering (for the time being) the separation seen by the recording gap.
Figure 9B:
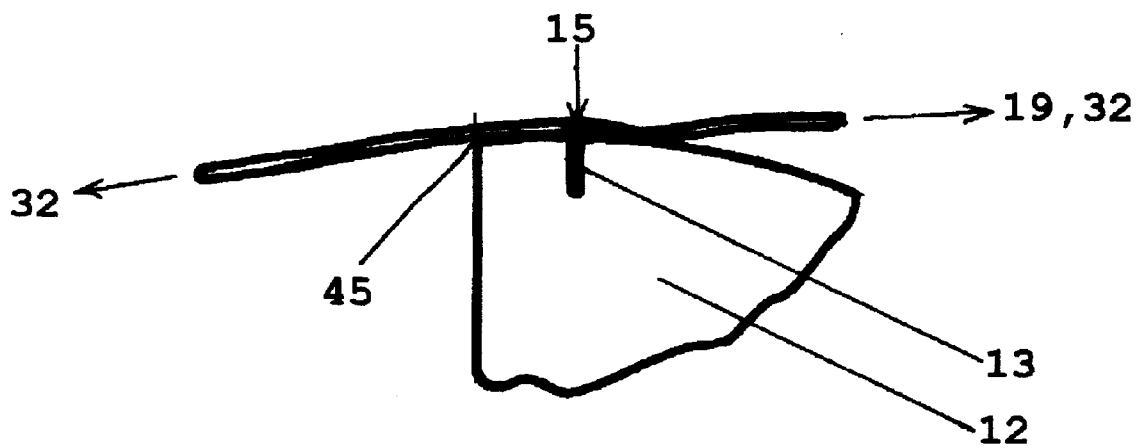
Figure 10A:
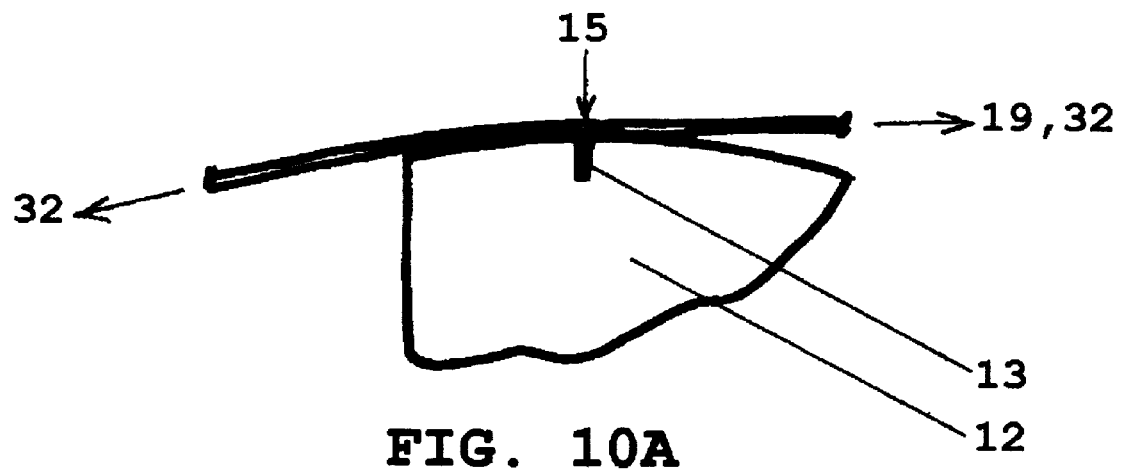
FIGS. 10A and 10B are views that show what happens to the separation at the recording gap when the sharp leading edge (described in FIG. 9A) is worn into a bigger radius.
Figure 10B:
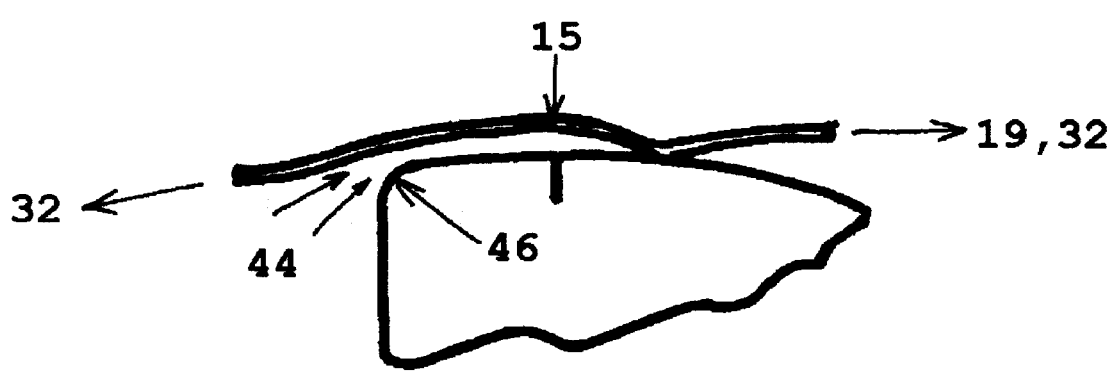
Figure 11A:
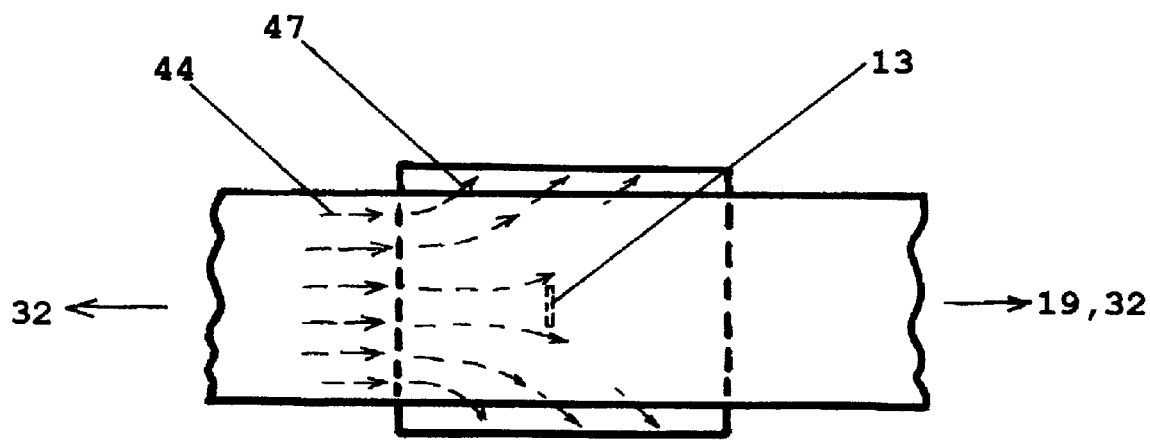
FIGS. 11A and 11B are a top and side view, respectively, that describe the side leakage of the built-up air film under the media as it travels across the recording head contour.
Figure 11B:
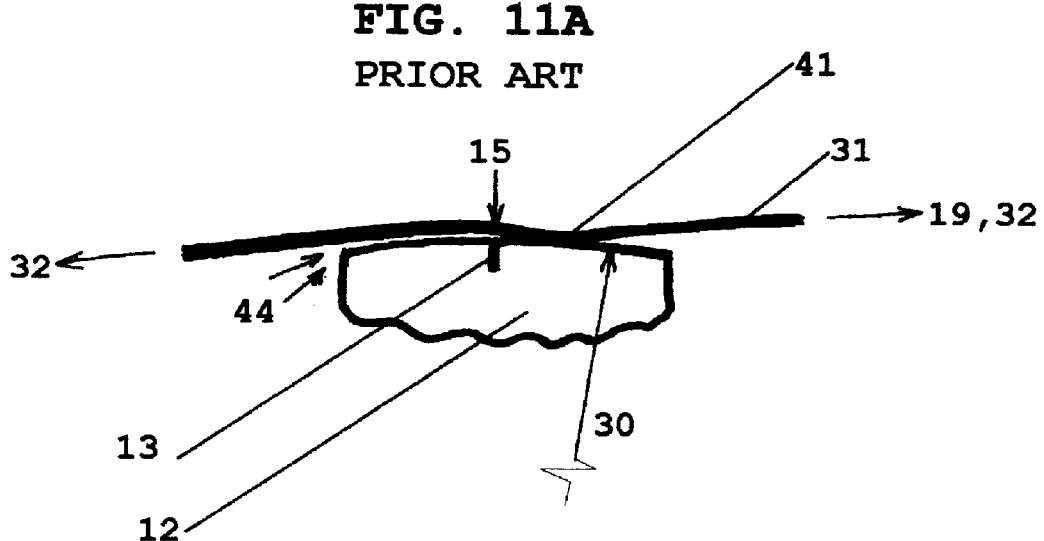
Figure 12:
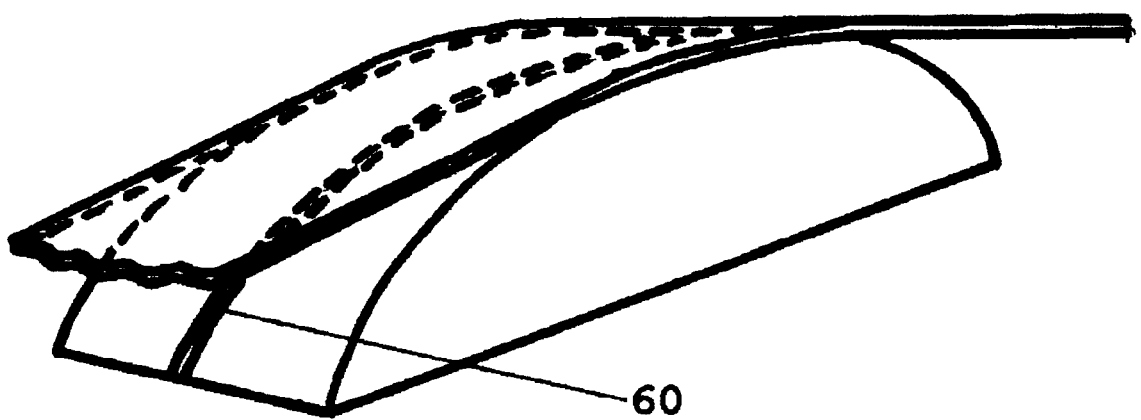
FIG. 12 is a simple description of the contour described in Baumeister U.S. Pat. No. 3,170,045.
Figure 13:
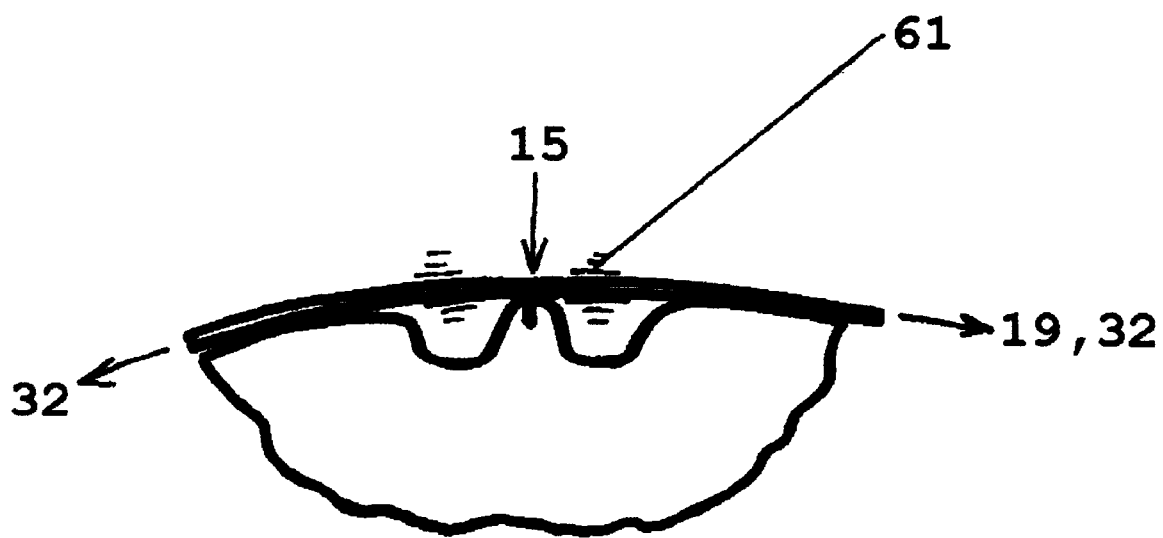
FIG. 13 is a simple description of the head-to-media configuration in Tomita U.S. Pat. No. 3,247,329.
Figure 14:
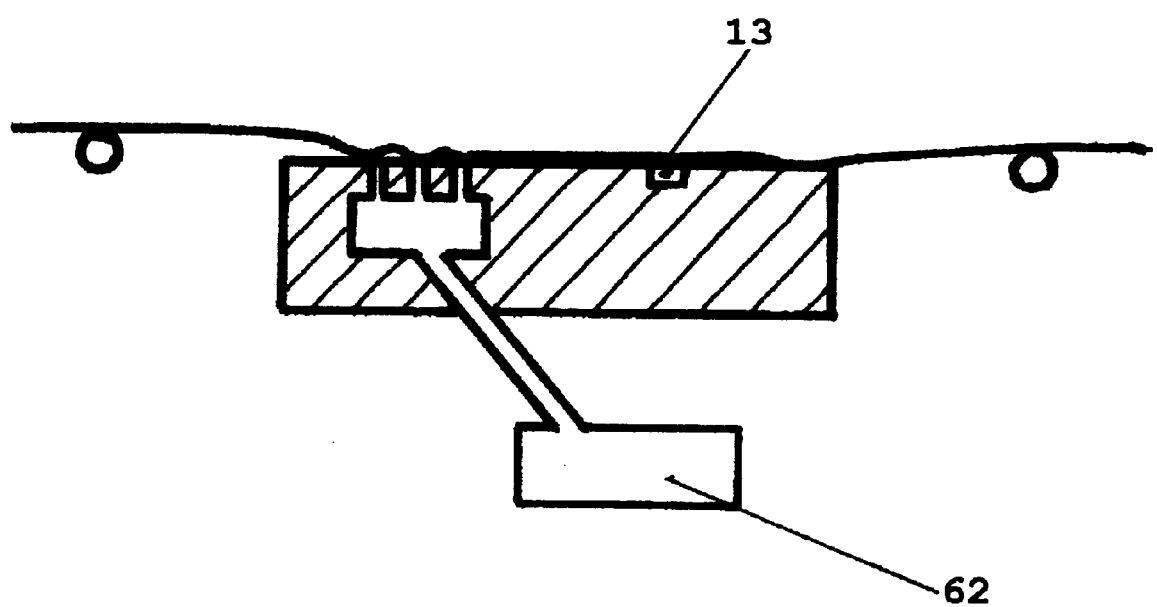
FIG. 14 is a view of the key feature of the Weidenhammer U.S. Pat. No. 3,327,916.
Figure 15:
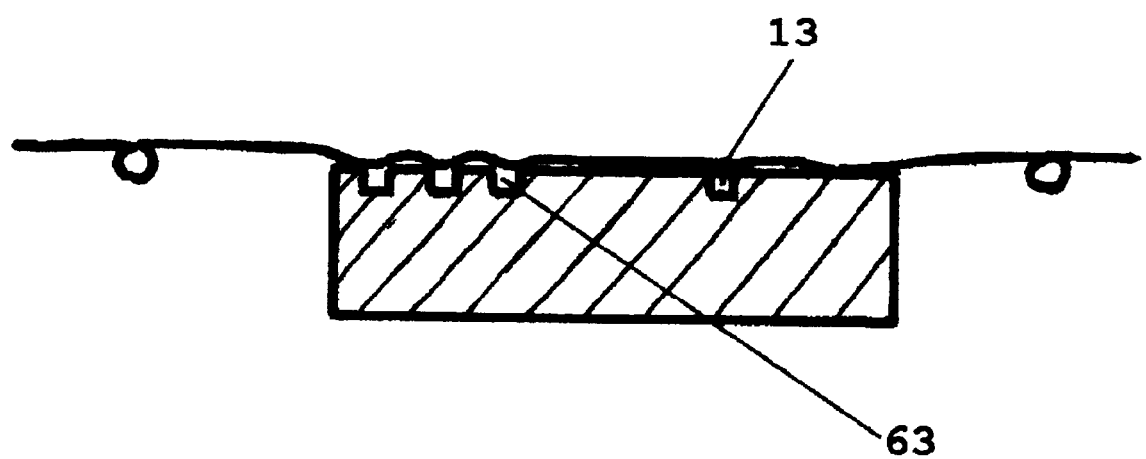
FIG. 15 is a view of the key feature of Mullan U.S. Pat. No. 3,398,870.
Figure 16:
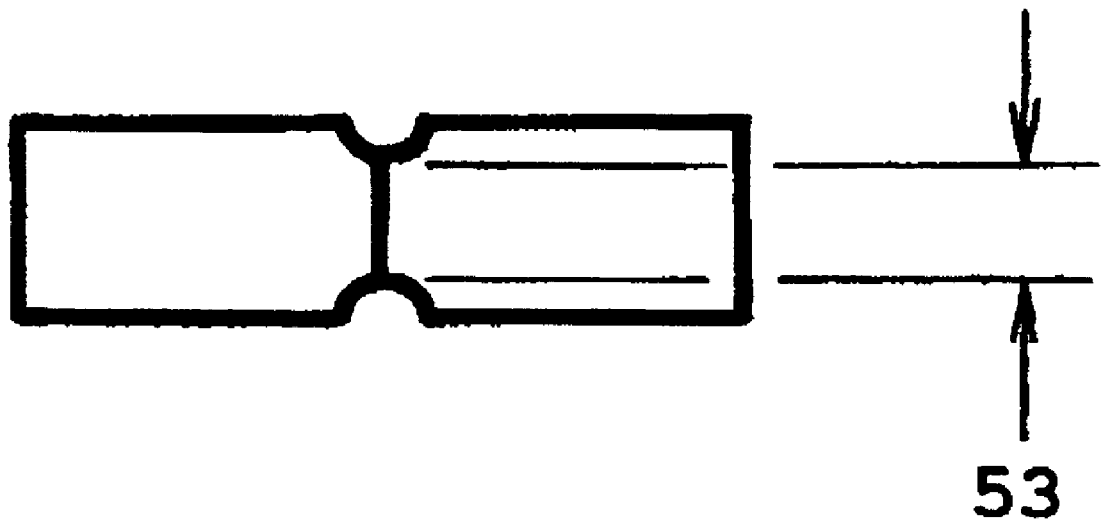
FIG. 16 is a view of a feature of the Sugaya U.S. Pat. No. 3,440,360.
Figure 17:
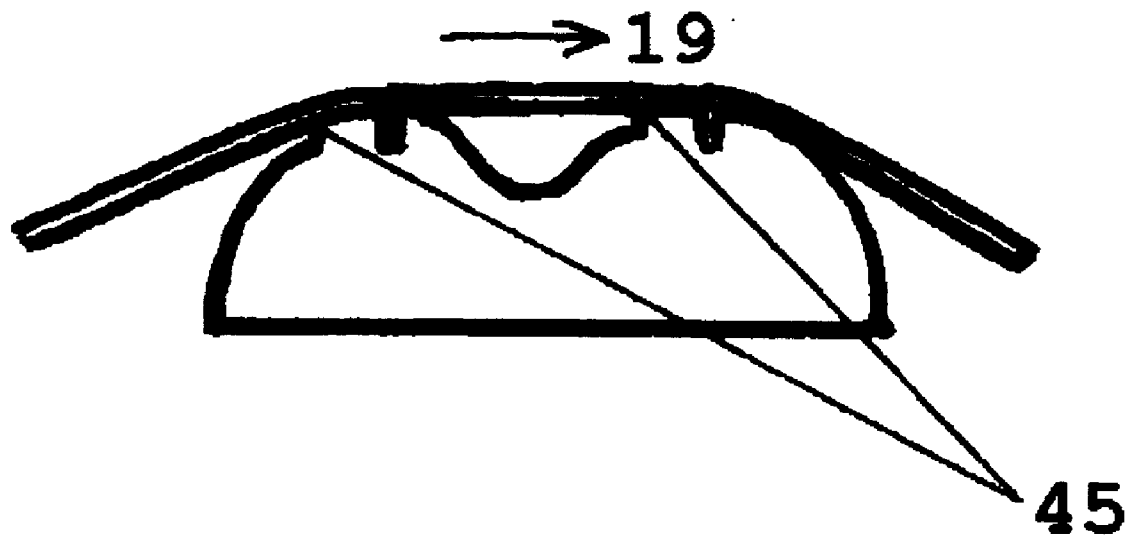
FIG. 17 is a description of the key function of the Flora U.S. Pat. No. 3,573,769.
Figure 18:
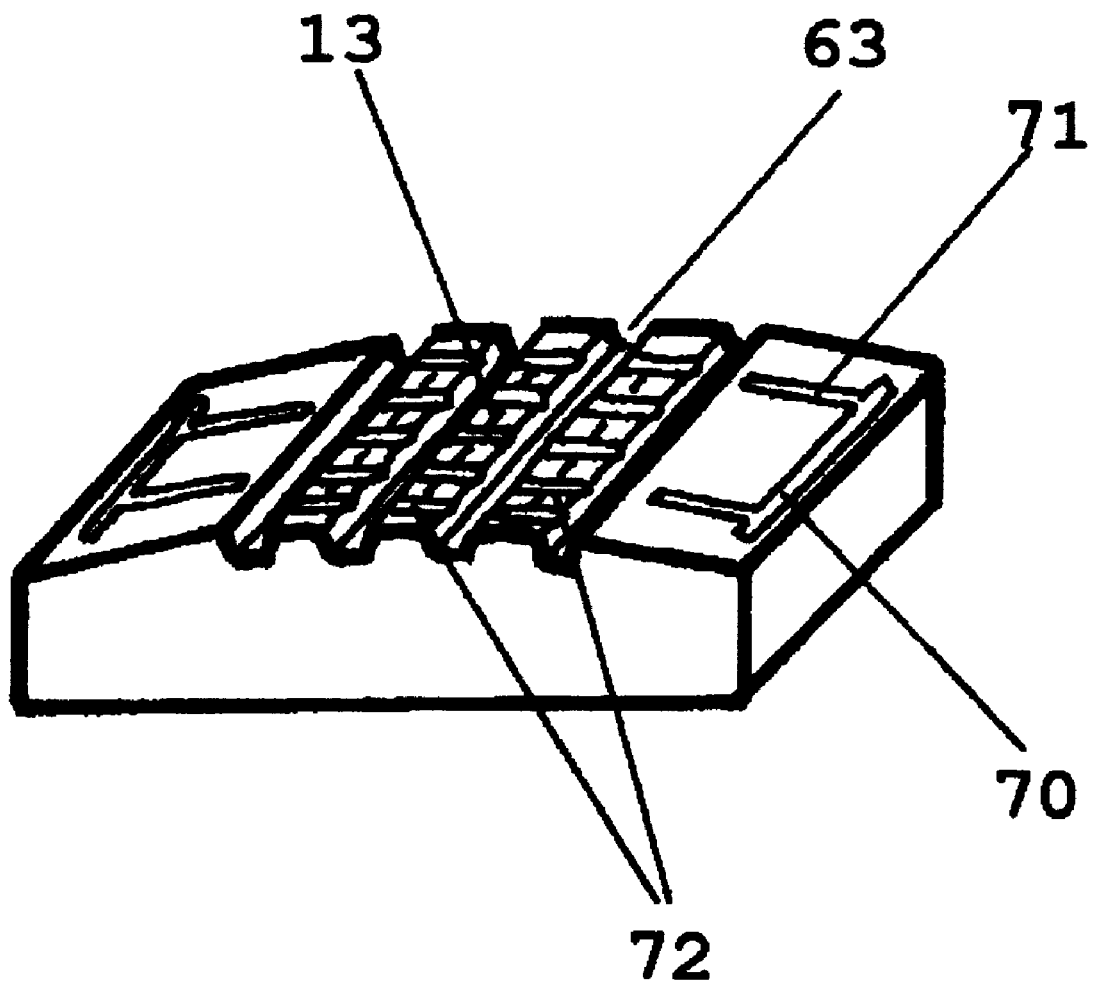
FIG. 18 is a isometric view of the Norwood U.S. Pat. No. 3,643,037.
Figure 19:
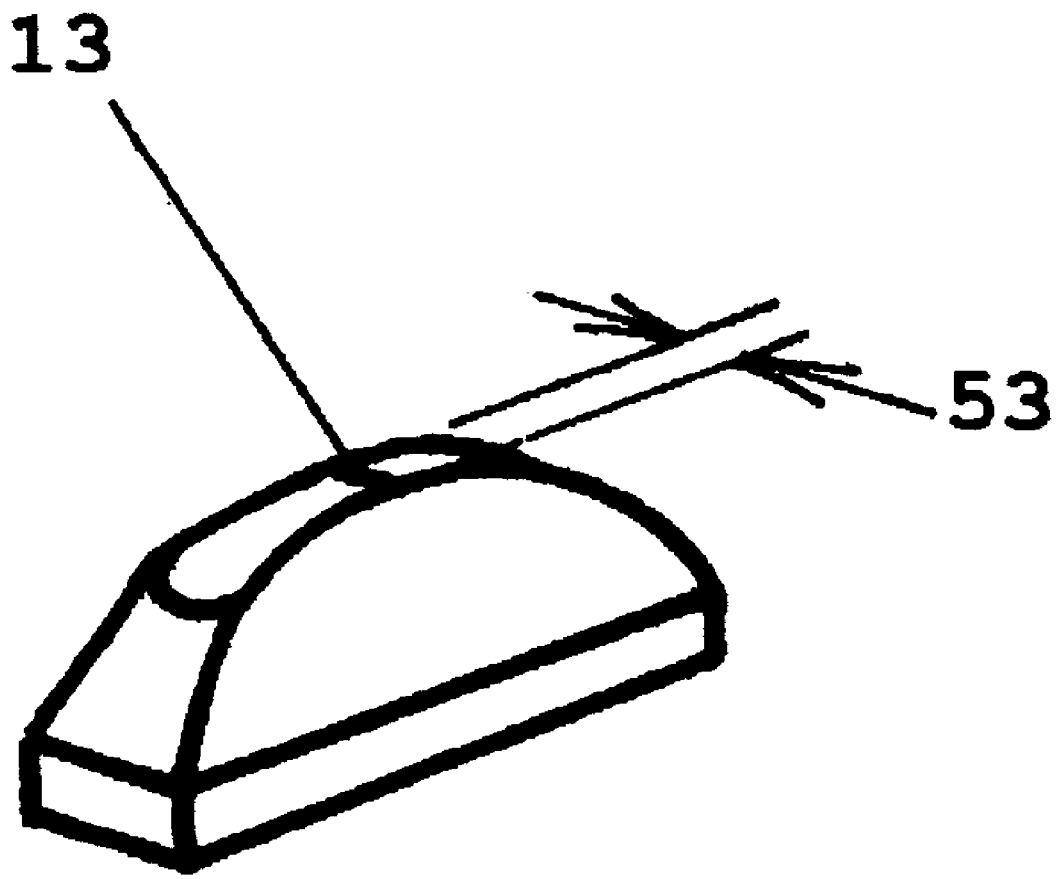
FIG. 19 is a is an isometric view of the Freeman U.S. Pat. No. 3,821,813.
Figure 20:
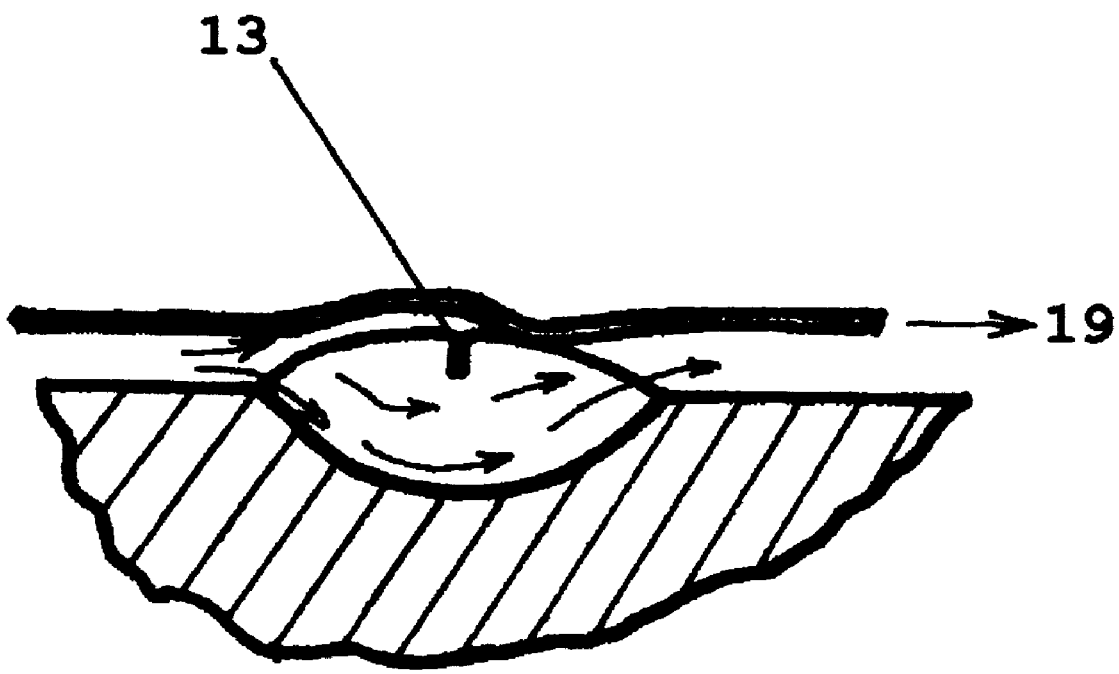
FIG. 20 is a cut-away side view of the Sano U.S. Pat. No. 3,872,507.
Figure 21:
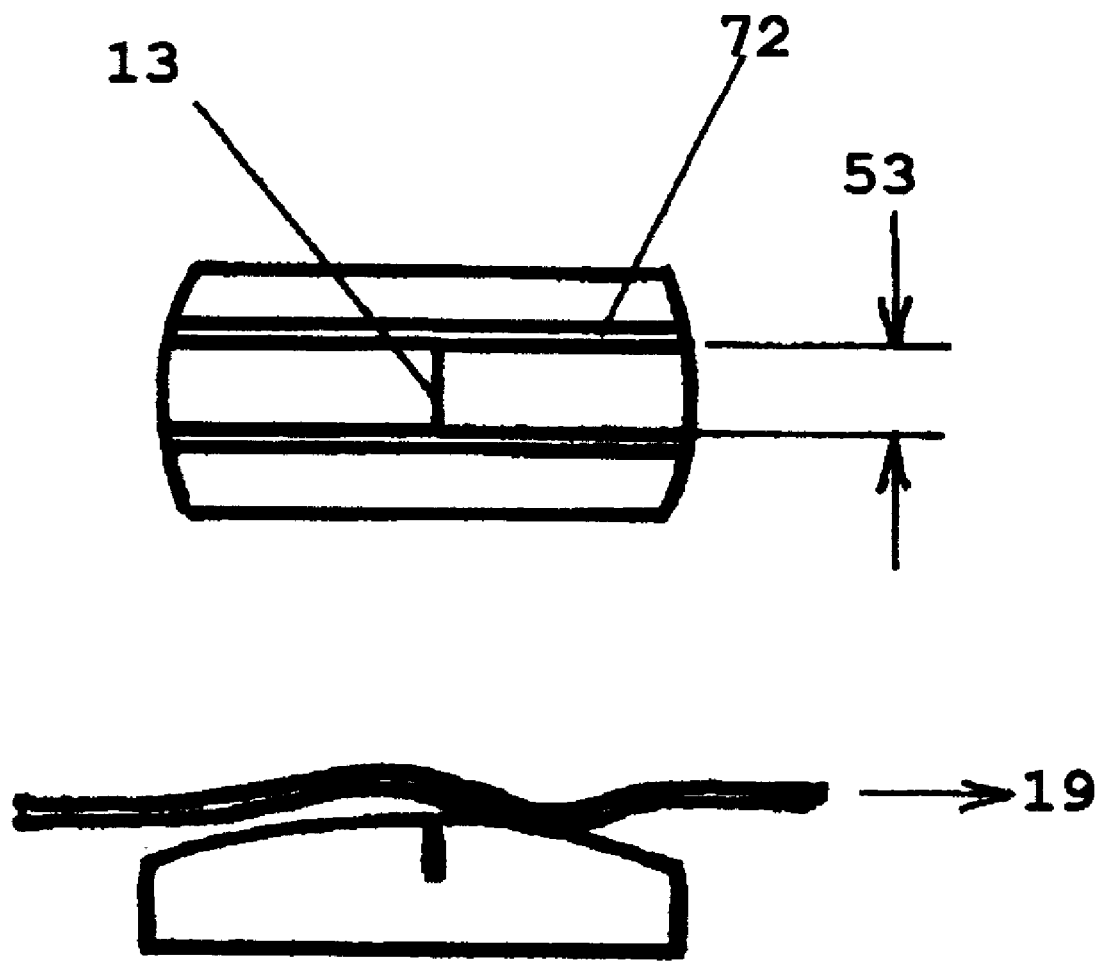
FIG. 21 is a top and side view of the Brock U.S. Pat. No. 3,961,372.
Figure 22:
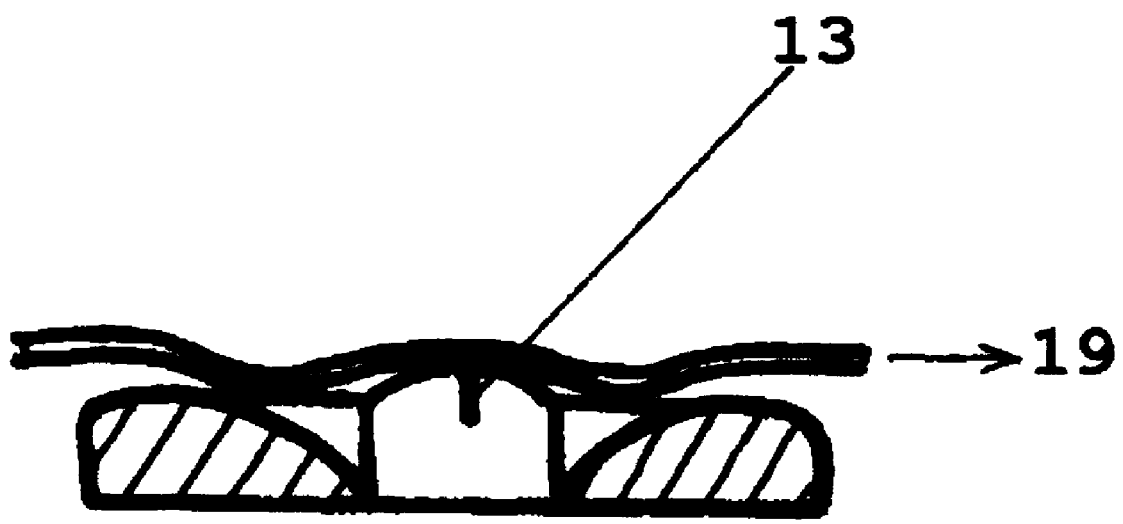
FIG. 22 is a side, cut-away view of the key feature of the Wright U.S. Pat. No. 4,003,091.
Figure 23:
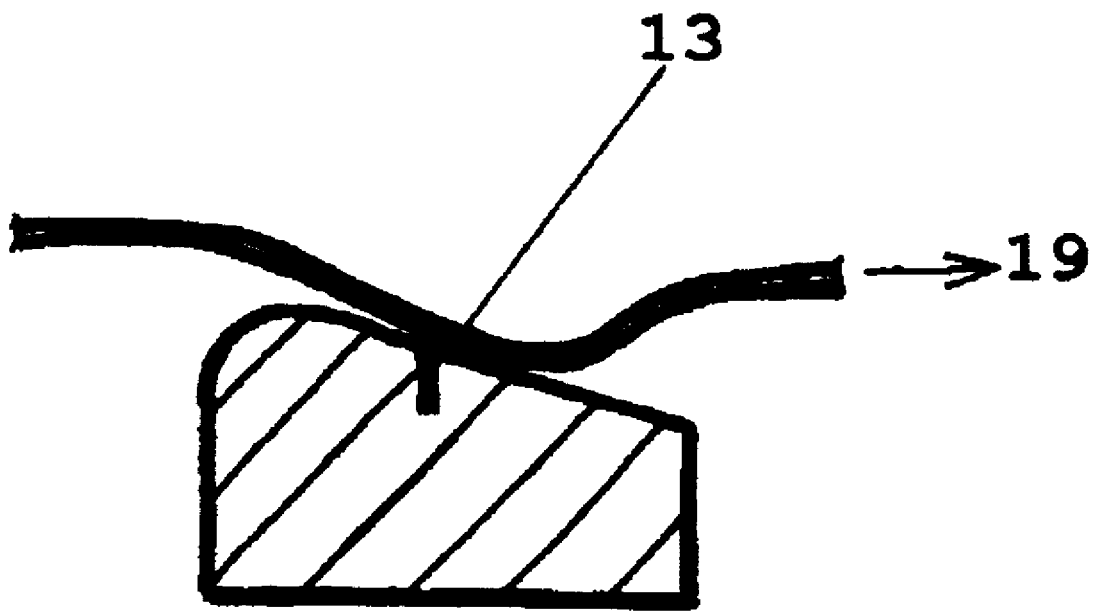
FIG. 23 is a side, cut-away view of the Negishi U.S. Pat. No. 5,047,884.
Figure 24:
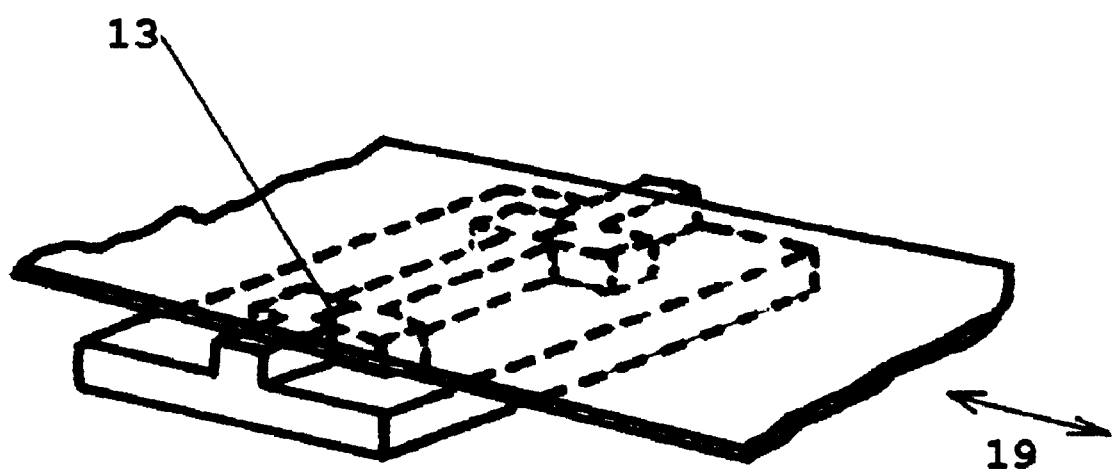
FIG. 24 is a isometric view with media placed upon it (in phantom lines) of the Saliba U.S. Pat. No. 5,055,959.
Figure 25:
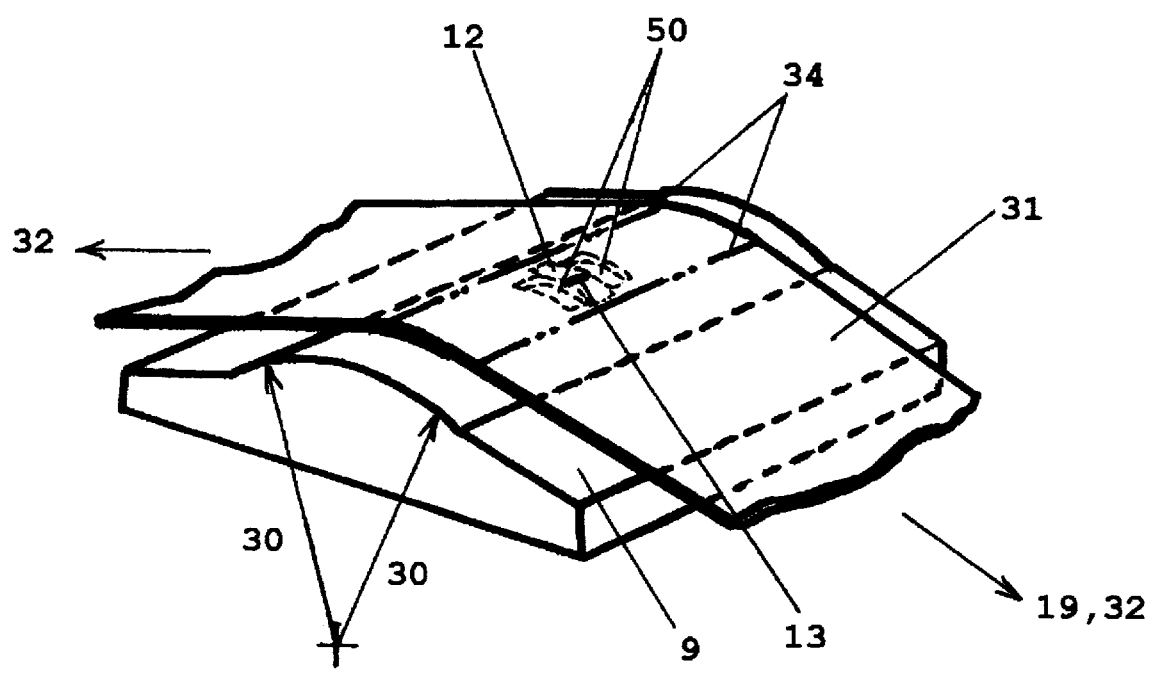
FIG. 25 is a isometric view of present invention in it's simplist form of one recording head gap and two Bernoulli Pockets on either side with media stretched over the contour radius under tension and with motion of the media in one direction.

Referring to FIG. 25 (and for a simple, single enity description at this point) a pair of Bernoulli Pockets 50 are placed into the top surface of head contour 9 of a recording head assembly on either side of a recording head core 12 and it's record/reproduce gap 13. Magnetic media 31 is wrapped around a curved surface at critical radius 30 and held in place with media tension 22 applied to both ends. The media is moving across this structure in relative direction 19 shown. The media starts to separate from the structure at the fixed distance left of pocket 38 on the forward side and fixed distance to pocket, right side, 39 of the gap as shown.

Figure 26:
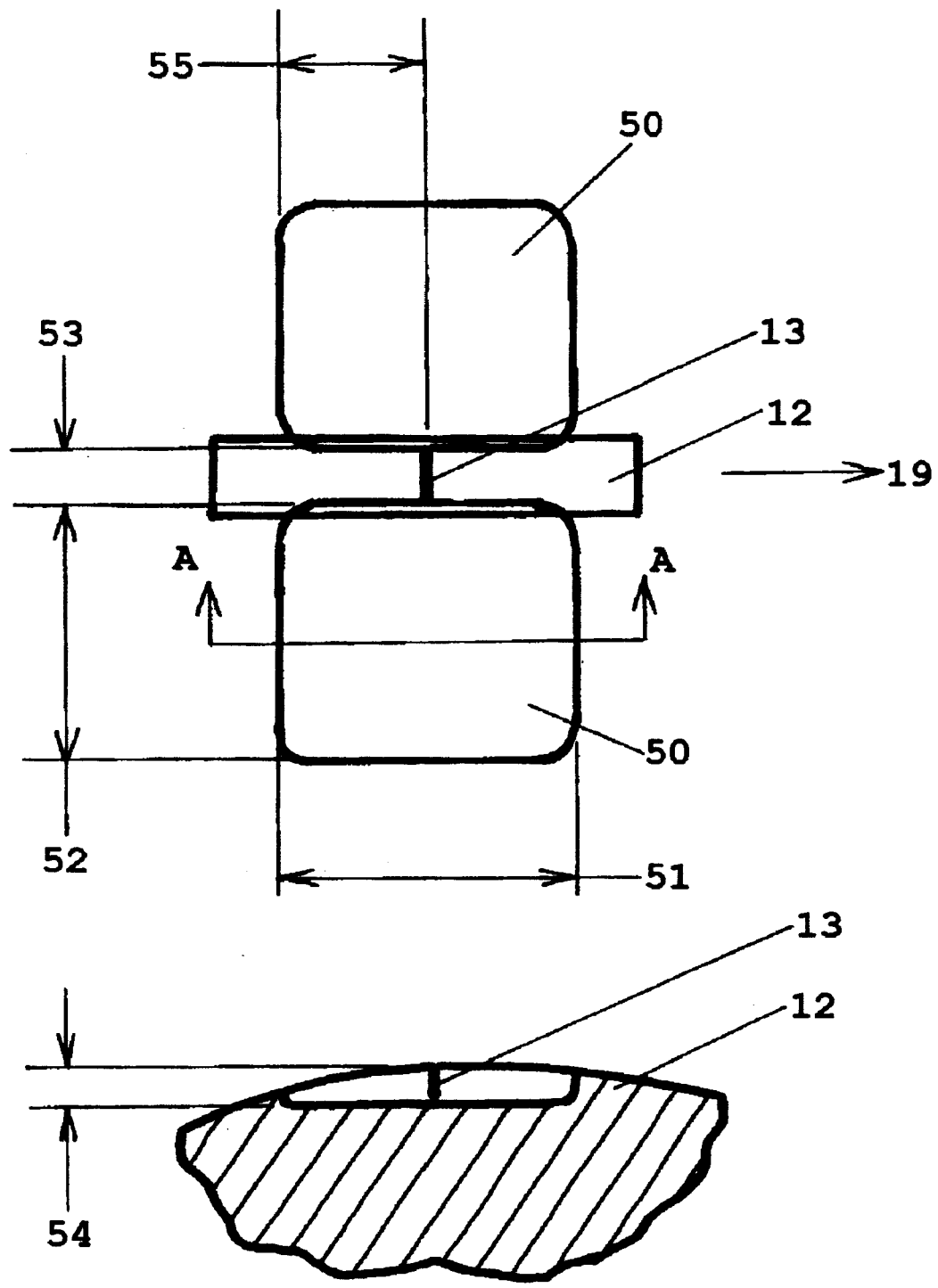
FIG. 26 is a detailed top view and cut-away side view of the Bernoullin Pocket that stradles a recording gap along with dimension control callouts.

Referring now to FIG. 26 the top view shows detail of two Bernoulli Pockets 50 located on either side of the gap. The head core 12 and it's gap 13 are shown relative to the media movement direction 19. The top Bernoulli Pocket is shown slightly entering the top edge (from above in this view only) of the head core 12 itself. The bottom Bernoulli Pocket is shown slightly entering from below the head core also. The effective recording gap width 53 is established by the positioning of the two Bernoulli pockets shown in this figure.

The pocket width 51 and the pocket height 52 of the Bernoulli Pockets are shown in the top view of this same figure while the pocket depth 54 is shown in the bottom View A—A. The Pockets are intended to stradle the gap so equal amount will be placed on either side of the gap as shown by centering dimension 55. The effective gap width that is created by the positioning of the top pocket and bottom pocket as shown entering the space occupied by the core results in a manufactured gap width that would meet the product's Track Width Specification. It can also be that these Bernoulli Pockets just touch the core 12 sides if the gap width is controlled by the manufacturing of the cores themselves. The critical heart of this patent is to place the Bernoulli Pockets at the very closest proximity to the gap 13 as physically possible. This will result in the very lowest flying possible with the specified critical radius 30 desired. Moving these Bernoulli Pockets slightly away from the core sides will produce low flying for the head-to-media interface that might work for a particular Magnetic Tape Product design, but it will not be the optimum possible.

Figure 27:
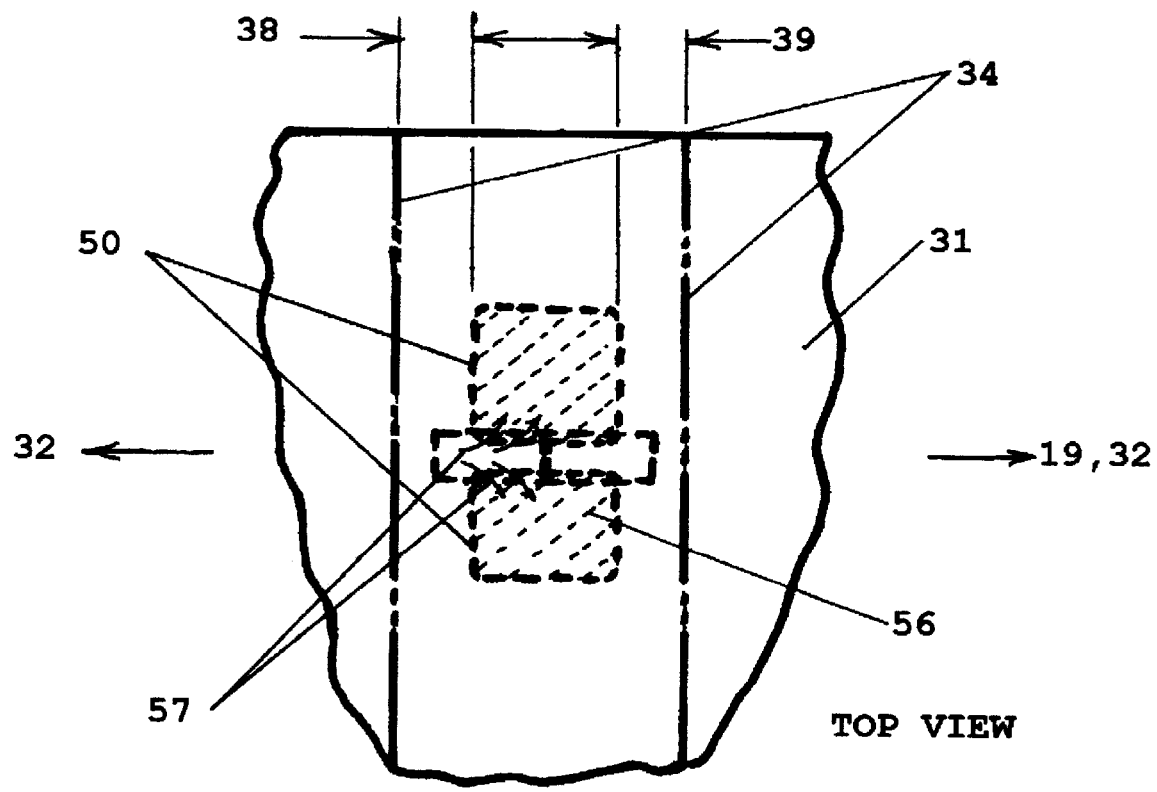
FIG. 27 is a top view showing how the tangeant lines where the media separates from the head contour are located relative to a typical, simple Bernoulli Pocket/Head Gap configuration.

Referring to FIG. 27 the dimensions of the Pockets height, width and centering shall be controlled so that a fixed left space and fixed right space will be maintained outside the Pocket's edges and the lines of tangency 34. This will insure a sealed cavity will be provided around the Bernoulli Pockets so a forced negative pressure (vacuum) 56 can be generated with relative motion of the media at all conditions. This aerodynamic principle and the resulting vacuum pockets being generated also applies to a moving head and fixed media type of data storage product. It is noted that the placement of the Bernoulli Pockets as shown in the FIGS. 26 and 27 both determine the effective width of the gap. The gap that lies below the contour surface but inside the pocket itself is effectively far enough away magnetically from the media. No writing or reading of magnetic data on or off the media from this recessed gap section is possible with the perceived values of the pocket depth.

Again with reference to FIG. 27 a single recording gap with Bernoulli Pockets on either side are shown under media along with lines of tangency on both sides of the gap and pocket assembly. The media is under tension control and is moving across the contour surface. The core and gap are shown also. A vacuum pressure head will develop under the media-to-head relative moving conditions and at the same time there will be forced side leakage 57 out from the media-to-head interface area as shown due to the negative pressure setup in the Bernoulli Pockets.

Depending upon the media stiffness, media thickness, media speed across the recording head, level of tension to be used to hold the media onto the head, the final radius of the support portion of the head gap(s), and the desired track density; the dimensions of the Bernoulli Pockets, width, height and depth will be selected to provide the head-to-media separation required for reliable data recording and playback. The size and shape of the Bernoulli Pockets can be different for each magnetic tape device developed under the guidance of this patent. The size, shape and volume of the Bernoulli Pocket cavities can be designed to influence the time before vacuum level is at it's maximum level. Depending upon the length of the pockets, along the media motion direction, the length of low flying conditions can be maximized. It should be noted that as long as the bump radius value is equal or greater than the calculated Critical Radius the best wear condition for head and media is present. The volume of the cavity under the tape will impact the time it takes to setup the maximum vacuum pressure. Larger volume equals longer time to setup, and smaller volume speeds this settling time up.

The design shown in this patent can operate in either forward or reverse directions and be able to provide the same separations in either direction. This is due to the fact that the size (and shape) of the Bernoulli Pockets can provide low flying in either direction by forcing early side leakages, harder pressure upon the media to squeeze down upon the recording head gaps, all the while providing the best possible wear conditions. This improved wear situation is due to the curvature of the media provided by the contour radius and corresponding resistance to dipping down into the pockets because of media thin-film-like deformations. There are no straight sections over the pockets that would be easy to pull down into the cavities. An initial amount of wear may occur around the outside top edges of the pockets, but will diminish very soon thus providing an optimum media wear situation. The resulting media-to-head separation generated by this patent will be the lowest possible under any prior art conditions, and will produce a very reliable mechanical interface upon which to base a magnetic media recording device for computer data storage.

Figure 28:
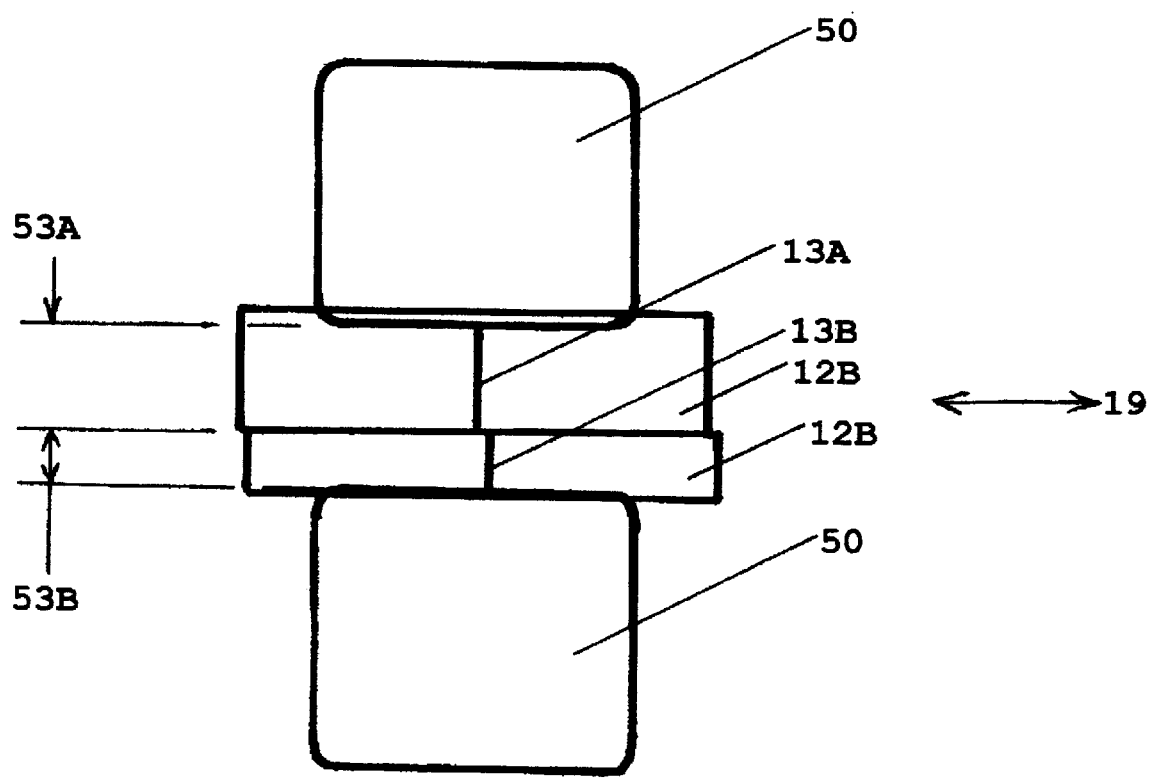
FIG. 28 is a top view of how a dual recording gap configuration with one pair of Bernoulli Pockets would be done per the current invention.

FIG. 28 shows a possible dual gap head core setup where the effective widths of the two gaps 53A and 53B are created from cores 12A and 12B and with gaps 13A and 13B. The widths of the two gaps can be different as shown this configuration. They are oriented perpendicular to direction 19.

Figure 29:
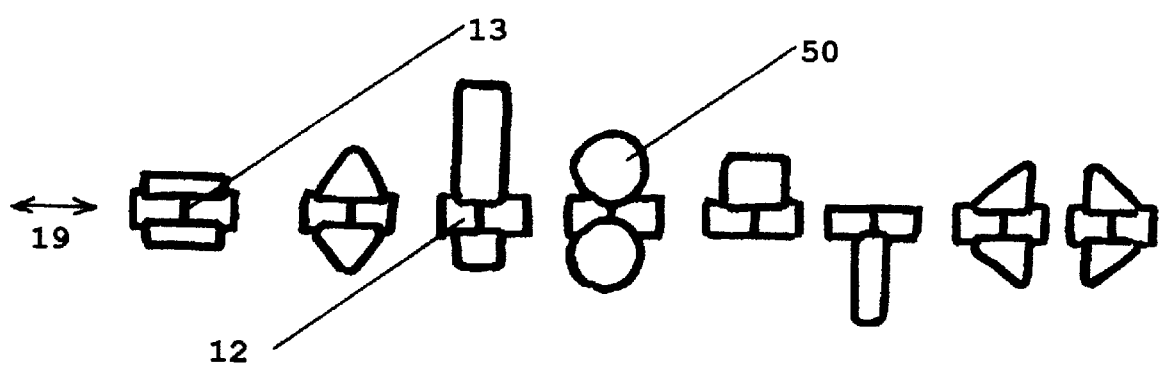
FIG. 29 is a layout of several shapes and sizes that the Bernoulli Pocket design may take and still comply the intent of the current patent.

FIG. 29 shows some various configurations that can be used in determining the shape and sizes of the Bernoulli Pockets used at each gap.

Figure 30:
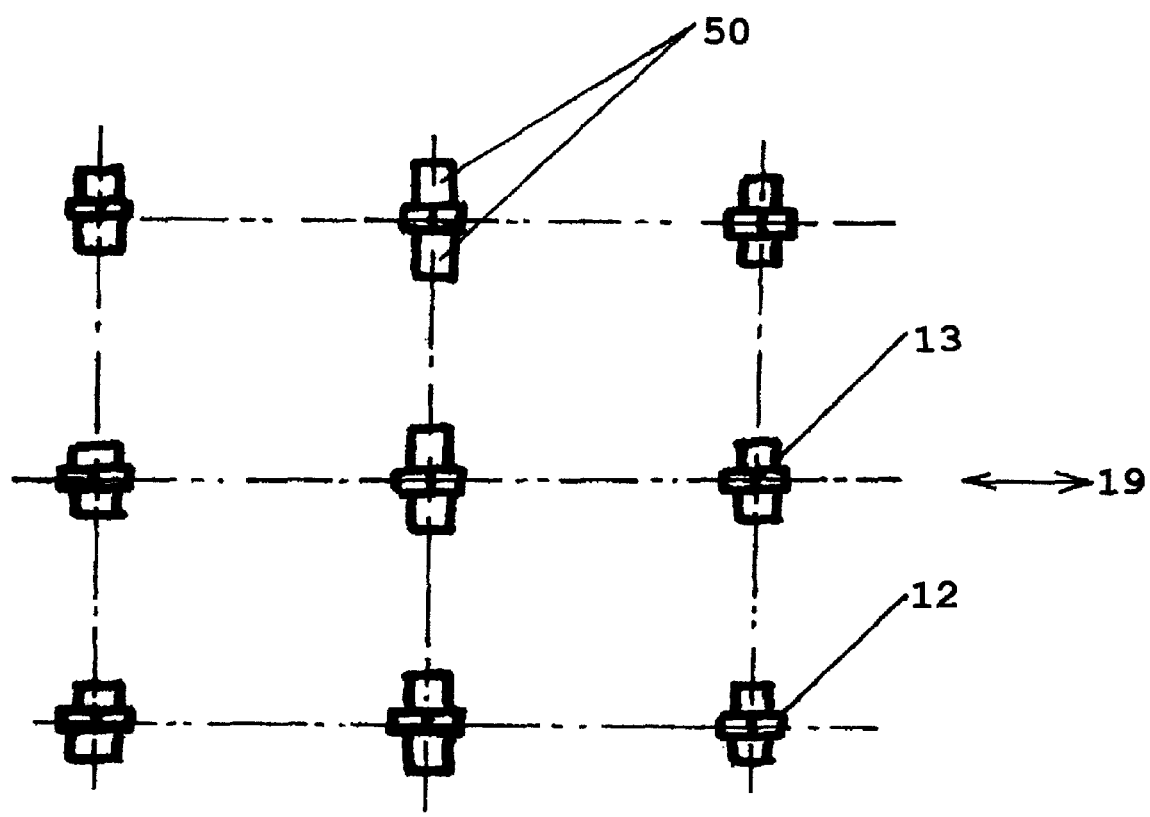
FIG. 30 is a overall layout of how a multiple channel data record head assembly with several gap and Bernoulli Pocket configurations could be assembled and still comply with the intent of the current patent.

FIG. 30 shows a configuration of multiple gaps used in a multichannel magnetic media product. They are also oriented perpendicular to direction 19.

While this invention primarily calls out the details for a single entity Bernoulli Pocket and Head configuration it is apparent that the same idea can be expanded to include a multiple gap Head. In this configuration multiple Read-Write Channel Serpentine Recorders can use this invention at great advantage. The individual Head areas act independently of each other. There is no known mode of interference possible between any pair of Heads. Thus a multiple Read-Write Channel Recorder may take advantage of the intent of this invention.

Figure 31:
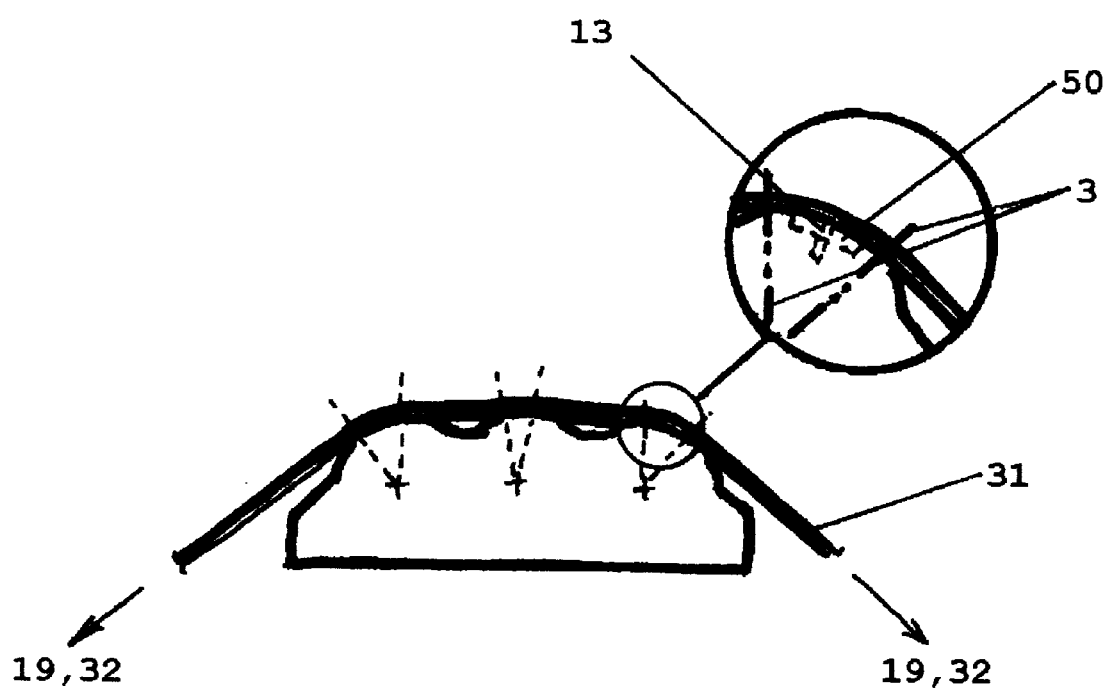
FIG. 31 is a side view of a three bump profile recording head contour would be constructed with the bump radius' equal or larger than the calculated critical media radius, and the Bernoulli Pockets contained inside the arc of contact of all three bumps for sealing impact.

FIG. 31 shows a typical side view of a three bump recording head contour layout showing the location of three sets of gaps 13 located approximately in the top center of each bump. A side view shows how the Bernoulli Pockets 50 are located on either side of the gap but inside the lines of tangency 34 while under tension 32 and traveling at direction 19 either way across the head. This would be the most popular configuration used in today's Tape Products. More than three bumps (like four) are also possible within the constraints of the tape path layout versus form factor that must be met by the Product. It is also possible for a two bump design to be done that employees the principles of this patent.

Multiple Channel Recorders may be able to use the 2, 3 or 4 Bump Head Contour shown here along with multiple Bernoulli Pocket and Gap combinations described earlier with no interference between any pair of Head areas. Banks of either Write or Read Gaps with Bernoulli Pockets located on either side of the gaps located each on a raised Bump can be built and be functional. Also a mixture of Write and Read elements on one raised Bump used with other Mixed Element Bumps adjacent can be done using the principles of this patent. The Gap configuration shown in FIG. 30 can be merged with the 3 Bump profile shown in FIG. 31.

While the bulk of this invention has been described in terms of a Magnetic Recording Head on flexible media (per the Figures provided) it should be noted that the closed area Bernoulli Pocket invention can be applied to Rigid Media such as Hard Disk Data Recorders, other Flexible Media Products such as Flexible Disks, and lastly can be applied to Flexible Media Products where either the Recording/Playback Head moves and the Media is stationary, or the Head moves and the Media is fixed in place; all while recording data upon the Media along tracks that are parallel to the relative direction between the Head and the Media. It is assumed that the Head may be moved sideways in order to establish another data track to be recorded or played back.

Accordingly, it can be seen that by incorporating the Bernoulli Pockets in very close proximity, as specified in this invention specification, to the magnetic head recording and playback gaps described in this invention, the recording media operating at high speeds upon any magnetic data storage recorder will be positioned within the separation height limits that insure reliable recording of the users' data. Recent advances in the speeds and data rates of the newest magnetic data recorders have caused the Head-to-Media separations to increase beyond that needed for accurate recording of the user's data. Magnetic Data Devices now on the market are having trouble demonstrating their reliability goals and specifications to their customer's satisfaction because of the failure of the machine designers to account for this area of importance in magnetic recording. The performance goals of various devices have been escalated without regard to this very important area. It is a very difficult technical area to comprehend and it is not apparent how to proceed in generating low separations at high speeds and/or higher linear densities. This invention breaks new ground in this important area of Backup Data Storage Devices being developed today.

Although the description above contains many specifics, these should not be construed as limiting the scope of the invention but as merely providing illustrations of some of the presently preferred embodiments of this invention. Various other embodiments and ramifications are possible within it's scope. Other examples would be to place the Bernoulli Pockets at some finite, small distance from the gap edges as a way to bypass the intent of this patent, or the Bernoulli Pockets may be placed at far distance away from the gaps along a line parallel to the media direction (with very large distances to the lines of tangency), or the Bernoulli Pockets may be placed outside the Lines of Tangency giving some measure of improved performance, but not the ultimate improvements possible by incorporating the full intention of this invention.

Thus the scope of the invention should be determined by the appended claims and their legal equivalents, rather than by the examples given.

What is claimed is:

1. A recording/reproducing magnetic head surface contour shape comprising: a) a contour shape support means for stabilizing flexible magnetic recording data storage media moving at a fixed speed relative to a magnetic head and flying over a transducing gap of said magnetic head under media tension, said contour shape support means having a spherical surface with a predetermined radius of curvature that faces said flexible magnetic recording data storage media; b) a physical cavity means for providing an aerodynamically caused vacuum pressure on either or both sides of said transducing gap and immediately located next to said transducing gap, said physical cavity means being at least one closed Bernoulli pocket wherein said at least one closed Bernoulli pocket is formed on said spherical surface and conforms to the radius of curvature of said spherical surface; and said at least one Bernoulli pocket defining the effective width of said transducing gap of said magnetic head.

2. The surface contour shape of claim 1 wherein said magnetic head is moving at said fixed speed and flying above said flexible magnetic recording data storage media.

3. The surface contour shape of claim 1 wherein said at least one Bernoulli pocket is of a size, shape, and depth that is consistent with space allowed on said spherical surface.

4. The surface contour shape of claim 1 wherein said cavity means is contained within an area defined by media-to-head surface tangent lines.

5. The surface contour shape of claim 1 wherein said at least one Bernoulli pocket is provided on both sides of said transducing gap, normal to the direction of said media-to-head movement.

6. The surface contour shape of claim 1 wherein said surface contour shape is applied to flexible magnetic media disk storage.

7. The surface contour shape of claim 1 wherein multiple ones of said at least one Bernoulli pocket are located at respective multiple locations across a record/reproduce magnetic head assembly.

* * * * *